US012809054B2

(12) United States Patent
Li et al.

(10) Patent No.: US 12,809,054 B2
(45) Date of Patent: Nov. 24, 2026

(54) META-SURFACE OPTICAL ELEMENT

(71) Applicant: Tamron Co., Ltd., Saitama (JP)

(72) Inventors: Jie Li, Saitama (JP); Terufusa Kunisada, Saitama (JP)

(73) Assignee: TAMRON CO., LTD., Saitama (JP)

( * ) Notice: Subject to any disclaimer, the term of this patent is extended or adjusted under 35 U.S.C. 154(b) by 616 days.

(21) Appl. No.: 18/242,907

(22) Filed: Sep. 6, 2023

(65) Prior Publication Data

US 2024/0118454 A1 Apr. 11, 2024

(30) Foreign Application Priority Data

Oct. 11, 2022 (JP) ................................ 2022-163489

(51) Int. Cl.
*G02B 1/00* (2006.01)
*G02B 3/08* (2006.01)

(52) U.S. Cl.
CPC ............... *G02B 1/002* (2013.01); *G02B 3/08* (2013.01)

(58) Field of Classification Search
CPC ........ G02B 13/06; G02B 13/04; G02B 13/18; G02B 27/0056; G03B 37/04
See application file for complete search history.

(56) References Cited

U.S. PATENT DOCUMENTS 11,874,476 B1 * 1/2024 Kress .................... G02B 27/30
2015/0219806 A1 8/2015 Arbabi et al.
2019/0064532 A1 2/2019 Riley, Jr. et al.
2021/0103075 A1 * 4/2021 Park ...................... G02B 5/126

FOREIGN PATENT DOCUMENTS

JP 2020-537193 A 12/2020
JP 2021-012376 A 2/2021

* cited by examiner

*Primary Examiner* — James C. Jones
(74) *Attorney, Agent, or Firm* — Paratus Law Group, PLLC

(57) ABSTRACT

A meta-surface optical element includes a substrate and pillars made of a-Si:H and arranged on a surface of the substrate. The pillars on the surface of the substrate are away from each other at a distance in a range of 300 to 450 nm between the centers thereof, the pillars have heights in a range of 300 to 580 nm, and the pillars have diameters in a range of 100 to 250 nm.

9 Claims, 25 Drawing Sheets

META-SURFACE OPTICAL ELEMENT

CROSS-REFERENCE TO RELATED APPLICATIONS

This application is based on and claims the benefit of priority from Japanese Patent Application No. 2022-163489, filed on Oct. 11, 2022, the entire contents of which are incorporated herein by reference.

BACKGROUND OF THE INVENTION

Technical Field

The present invention relates to a meta-surface optical element.

Related Art

Light having a near-infrared wavelength is used in various industrial fields. For example, light having a near-infrared wavelength is used in a medical inspection device, a medical treatment device, a healthcare measurement device, used for various kinds of non-destructive inspections such as an inspection of food and an inspection of a growth situation of an agricultural product, and further used for traffic monitoring, surveying, and optical communication, and used in an object recognition device for a self-driving vehicle, a biometric authentication device, and a barcode reading device.

There are two main reasons why near-infrared light is used for these applications. One reason is that near-infrared light is not dazzled because it is invisible to human eyes, and thus, near-infrared light does not interfere with visual recognition. The other reason is that light in the near-infrared wavelength region corresponds to a vibration excitation wavelength reflecting a bonded state between atoms in a substance, and accordingly, information reflecting a chemically bonded state of the substance can be acquired.

Furthermore, in medical applications as special applications, near-infrared light is in a wavelength region with high biological permeability, and information inside a living body can be observed in the near-infrared wavelength region.

Currently, refractive type lenses such as plastic lenses and glass lenses are used as near-infrared lenses used for these applications.

In recent years, a meta-surface optical element called a meta-lens, which controls refraction of incident light by arranging nano-sized pillars on a flat plate substrate, has been actively developed. As an example of the meta-surface optical element, there has been known a meta-surface optical element in which nano-sized pillars formed using hydrogenated amorphous silicon (hereinafter, also simply referred to as "a-Si:H") as a material are arranged on a transparent substrate (for example, see JP 2020-537193 A and JP 2021-12376 A).

In a meta-surface optical element, it is necessary to appropriately arrange pillars having various phase shift amounts in addition to high transmission of target light. In addition, the optical element is generally required to have productivity in addition to reductions in size and thickness. The meta-surface optical element including a-Si:H pillars according to the above-described conventional technique have insufficient optical characteristics such as transmission and refractive index in a wavelength region of 700 to 850 nm, which means that it may be difficult to manufacture pillars exhibiting desired optical characteristics.

An object of an aspect of the present invention is to provide a meta-surface optical element having excellent optical characteristics even at a wavelength of 700 to 850 nm together with excellent productivity.

SUMMARY OF THE INVENTION

According to an aspect of the present invention for solving the aforementioned problem, a meta-surface optical element includes: a substrate; and pillars made of hydrogenated amorphous silicon and arranged on a surface of the substrate, in which the pillars on the surface of the substrate are away from each other at a distance in a range of 300 to 450 nm between the centers thereof, the pillars have heights in a range of 300 to 580 nm, and the pillars have diameters in a range of 100 to 250 nm.

According to an aspect of the present invention, it is possible to provide a meta-surface optical element having excellent optical characteristics even at a wavelength of 700 to 850 nm together with excellent productivity.

DESCRIPTION OF THE EMBODIMENTS

Figure 1:
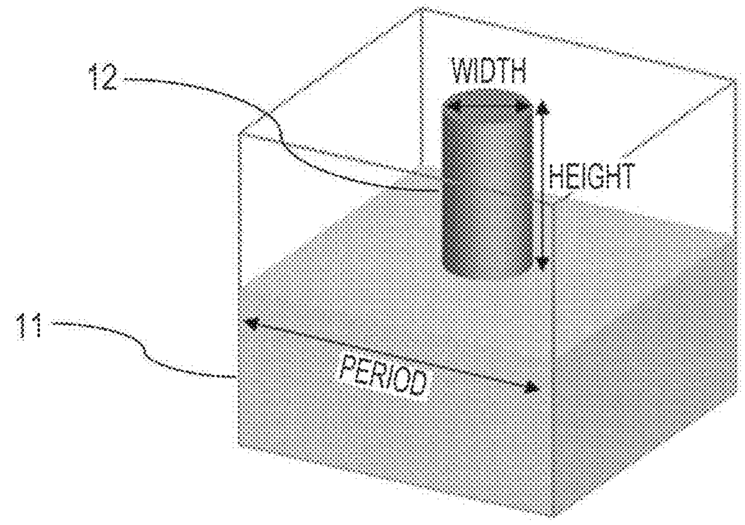
FIG. 1 is a view for explaining an analysis model used in electromagnetic field analysis for determining dimensions of pillars used in a simulation.

An embodiment of the present invention provides a meta-surface element that controls light in a near-infrared region. The provided meta-surface element may be used for light condensing, diffusion, or separation of polarized light. Hereinafter, the embodiment of the present invention will be described. In the present specification, unless otherwise specified, "to" indicates a range including a smallest numerical value preceding the term "to" and a largest numerical value following the term "to".

A meta-surface optical element according to an embodiment of the present invention includes a substrate and pillars. The meta-surface optical element is an optical element including a meta-surface. The meta-surface is a two-dimensional structure including periodic structures (meta-material) that are finer than a wavelength of light. Such an optical element is ultra-small and light, and thus is expected to be used in downsizing of a small flying robot, an eye of a drone, a virtual reality headset, or a projector, thinning of a smartphone camera, or the like.

In the meta-surface optical element, the substrate is appropriately determined, for example, depending on the type of the optical element. For example, in a case where the meta-surface optical element is used as a lens, the substrate may be a member having translucency in the near-infrared region. Examples of the material of the substrate include quartz, borosilicate glass, and polycarbonate.

The pillars are individual structures of the aforementioned periodic structures. The pillars have dimensions smaller than a wavelength of light targeted by the meta-surface optical element. The pillars may have a structure arranged on the surface of the substrate, and have heights and diameters. The shapes of the pillars are not limited, and the pillars may have various shapes. The height of the pillar is a distance between both ends of the pillar in the axial direction. The diameter of the pillar is a representative dimension (cross-sectional dimension) of the pillar in the cross-sectional shape, and is a length of one side of a rectangle circumscribing the cross section of the pillar. Among the lengths of the sides of the rectangle circumscribing the cross section of the pillar, the longer side is referred to as a long diameter, and the shorter side is referred to as a short diameter.

When the quadrangle circumscribing the cross section of the pillar is a square, the pillar has only one diameter. As an example in which the cross-sectional shape of the pillar is a shape having high symmetry such as a circle, a square, or a regular hexagon. A meta-lens including pillars having such a cross-sectional shape can be a meta-lens that does not depend on polarization. In a case where the pillar has a long diameter and a short diameter, that is, in a case where the pillar has a cross-sectional structure having low symmetry such as a rectangle or an ellipse, dependence on polarization can be imparted to the meta-lens. Such a polarization-dependent meta-lens makes it possible to realize a polarization camera. Therefore, in order to eliminate dependence on polarization, the pillar may have various cross-sectional shapes such as a circle, a square, a hexagon, and an octagon. In order to impart dependence on polarization, the pillar may have various cross-sectional shapes such as a rectangle, an ellipse, and a rhombus. In order to facilitate design and eliminate dependence on polarization, it is preferable that the pillar has a circular cross-sectional shape. In this case, the height of the pillar is a distance between opposite end faces of the cylindrical body, and the diameter of the pillar is a diameter of the cylindrical body.

The pillars are arranged to achieve desired phase shift amounts with respect to light targeted by the meta-surface optical element. This arrangement is appropriately determined according to an intended optical element function.

For example, in a case where the meta-surface optical element is a lens (hereinafter, also referred to as "meta-lens"), when the lens is formed of a glass material, the pillars are arranged so that the phase shift amount periodically changes according to the curvature of the surface. In this case, the pillars are arranged so that the rate of change in phase shift amount is lower in a portion of the substrate corresponding to a portion of the lens of the glass material where the curvature is gentle. On the other hand, the pillars are arranged so that so that the rate of change in phase shift amount is higher in a portion the substrate corresponding to a portion of the lens where the curvature is steeper.

The pillars are made of a-Si:H. That is, the pillars consist of a-Si:H. a-Si:H is an amorphous material in which hydrogen is bonded to a dangling bond of amorphous silicon. The composition of a-Si:H can be controlled by a known technique, and may be appropriately adjusted according to what the meta-surface optical element is used for. The pillars may further contain another component (dopant or the like) other than a-Si:H as long as the effect of the present invention can be obtained.

The arrangement of the pillars in the meta-surface optical element can be appropriately determined within a range in which the effect of the present invention can be obtained. For example, the pillars may be arranged in a lattice pattern on the substrate. The arrangement in the lattice pattern, a square lattice or a hexagonal lattice may be used.

The phase shift amounts of the pillars in the meta-surface optical element can be adjusted by the dimensions of the pillars. That is, the aforementioned phase shift amount can be changed by adjusting the height of the pillar, the diameter of the pillar, the distance between the centers of the pillars, or all of the three factors. From the viewpoint of productivity, it is preferable that the pillars have a uniform height. That is, it is preferable that a change in phase shift amount is expressed by arranging pillars having different diameters.

In an embodiment of the present invention, the distance between the centers of the pillars on the surface of the substrate is in the range of 300 to 450 nm, the heights of the pillars are in the range of 300 to 580 nm, and the diameters of the pillars are in the range of 100 to 250 nm. In a case where each of the pillars has both a long diameter and a short diameter, only one of the long diameter and the short diameter may be within the range of 100 to 250 nm as long as both the transmission and the phase delay effect are obtained, but it is preferable that both the long diameter and the short diameter are within the range of 100 to 250 nm in order to sufficiently exhibit both the transmission and the phase delay effect.

When the pillars are made of a-Si:H, and the distance between the centers of the pillars, the heights of the pillars, and the diameters of the pillars are within the above-described ranges, a high refractive index of near-infrared light having a wavelength of 700 to 850 nm is exhibited and a high transmission is exhibited. In addition, within the above-described ranges, there exists a region where the transmission is sufficiently high and the phase shift amounts of the pillars change from −π to π in a relationship of a monotonically increasing function. For example, when the pillars have a uniform height and the pillars have different diameters within the above-described ranges, there exists a region in which the transmission of near-infrared light is sufficiently high while having a relationship of a monotonically increasing function in which the phase shift amounts of the pillars change from −π to π. Other relationships may also exist. For example, when the pillars have a uniform diameter and the pillars have different heights within the above-described ranges, there exists a region in which the transmission of near-infrared light is sufficiently high while having a relationship of a monotonically increasing function in which the phase shift amounts of the pillars change from −π to π. Alternatively, when the pillars are different in both diameter and height within the above-described ranges, there exists a region in which the transmission of near-infrared light is sufficiently high while having a relationship of a monotonically increasing function in which the phase shift amounts of the pillars vary from −π to π. Therefore, by making the pillars different in a gradual manner in one or both of height and the diameter, the aforementioned periodic structures can be established by the pillars.

More specifically, the distance between the centers of the pillars on the surface of the substrate may be 300 nm, the heights of the pillars may be in the range of 300 to 400 nm, and the diameters of the pillars may be in the range of 100 to 200 nm. In this case, among regions represented by diameters and heights of the pillars, there exists a region in which the transmission of near-infrared light having a wavelength of 700 nm is sufficiently high, including pillars having phase shift amounts from −π to π with a uniform height in a relationship of a monotonically increasing function.

In addition, more specifically, the distance between the centers of the pillars on the surface of the substrate may be in the range of 350 to 400 nm, the heights of the pillars may be in the range of 400 to 550 nm, and the diameters of the pillars may be in the range of 100 to 220 nm. In this case, among regions represented by diameters and heights of the pillars, there exists a region in which the transmission of near-infrared light having a wavelength of 750 nm is sufficiently high, including pillars having phase shift amounts from −π to π with a uniform height in a relationship of a monotonically increasing function.

In addition, the distance between the centers of the pillars on the surface of the substrate may be in the range of 350 to 450 nm, the heights of the pillars may be in the range of 400 to 550 nm, and the diameters of the pillars may be in the range of 100 to 250 nm. In this case, among regions represented by diameters and heights of the pillars, there exists a region in which the transmission of near-infrared light having a wavelength of 800 nm is sufficiently high, including pillars having phase shift amounts from −π to π with a uniform height in a relationship of a monotonically increasing function.

In addition, the distance between the centers of the pillars on the surface of the substrate may be in the range of 350 to 450 nm, the heights of the pillars may be in the range of 380 to 580 nm, and the diameters of the pillars may be in the range of 100 to 250 nm. In this case, among regions represented by diameters and heights of the pillars, there exists a region in which the transmission of near-infrared light having a wavelength of 850 nm is sufficiently high, including pillars having phase shift amounts from −π to π with a uniform height in a relationship of a monotonically increasing function.

In these cases, pillars having diameters corresponding to desired phase shift amounts can be selected from a continuous region having a monotonically increasing function relationship in which the pillars have a uniform height according to a wavelength of near-infrared light targeted by the meta-surface optical element. Therefore, it is possible to configure the meta-surface optical element by repeatedly arranging a group of pillars having different diameters corresponding to desired phase shift amounts.

The meta-surface optical element can be manufactured by forming an a-Si:H layer on the substrate and etching the a-Si:H layer to form periodic structures. In this manufacturing method, since the thickness of the a-Si:H layer is equal to the height of the pillars, it is possible to easily manufacture the pillars having a uniform height. In addition, in the present embodiment, as described above, there exist a series of relationships in which a wide range of phase shift amounts and a high transmission are realized between the heights and the diameters of the pillars. Therefore, it is possible to select pillars having desired dimensions from a series of relationships between the diameters of the pillars corresponding to a wide range of phase shift amounts while the pillars have a uniform height. Therefore, the meta-surface optical element according to the present embodiment can be manufactured by arranging pillars on the surface of the substrate, the pillar being selected to have specific widths and specific heights from a specific region that is represented by the widths and the heights of the pillars, with a transmission of near-infrared light in a specific range (e.g., 90% or more on average), and includes pillars having phase shift amounts from −π to π.

Further, the cross-sectional shapes and the diameters of the pillars can be controlled by a patterning process such as nanoimprinting, electron beam lithography, or photolithography. Therefore, the above-described meta-surface optical element can be obtained through the simple process as described above.

Hereinafter, the dimensions of the pillars and the optical characteristics of the constructed meta-surface optical element will be described in more detail.

[Simulation 1]

A transmission of near-infrared light and a phase shift amount depending on a dimension of a pillar of a-Si:H were obtained. As an analysis model, a cylindrical pillar was adopted. In the analysis model pillar, the height of the pillar is a distance between end faces of the cylindrical body, and the diameter of the pillar is a diameter (width) of the cylindrical body. In addition, the distance between the centers of the pillars is a distance between center axes of adjacent cylindrical bodies. In addition, when the pillars are different in height, diameter, and distance between the centers thereof, transmissions and phase shift amounts of the pillars with respect to near-infrared light having a specific wavelength were obtained through electromagnetic field analysis.

FIG. 1 illustrates a pillar analysis model used for the electromagnetic field analysis. In the electromagnetic field analysis, a substrate 11 was $SiO_2$. In the drawings, "height" represents a height of the pillar, "width" represents a diameter of the pillar, and "period" represents a period of the pillar. The "period" is a length of one side of a section having a square planar shape with the pillar at the center, and corresponds to the distance between the centers of the pillars described above.

[When Wavelength is 700 nm]

Figure 2:
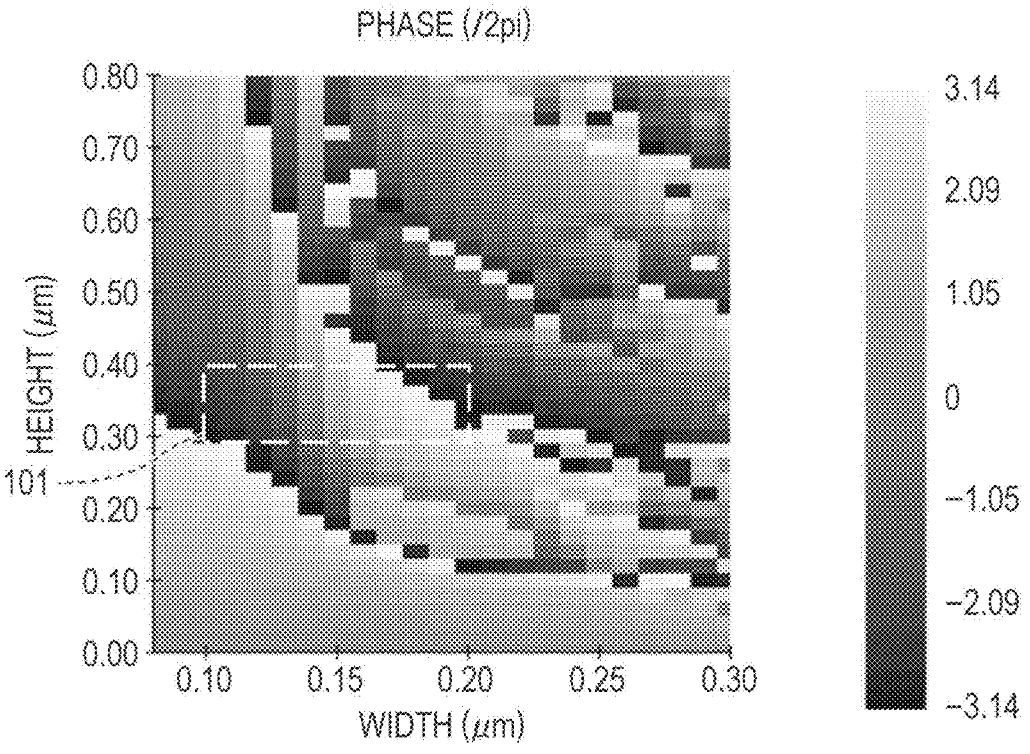
FIG. 2 is a view illustrating phase shift amounts of a-Si:H pillars with respect to near-infrared light having a wavelength of 700 nm when the pillars arranged at a distance of 300 nm between the centers thereof are different in diameter and height.
Figure 3:
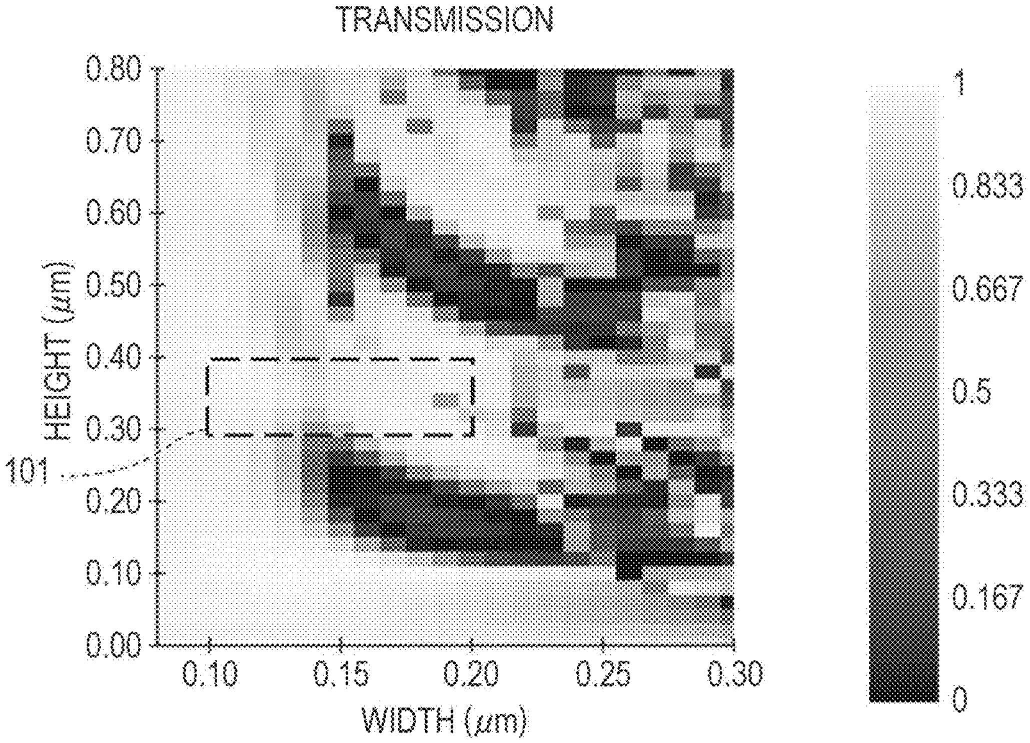
FIG. 3 is a view illustrating transmissions of a-Si:H pillars with respect to near-infrared light having a wavelength of 700 nm when the pillars arranged at a distance of 300 nm between the centers thereof are different in diameter and height.

FIG. 2 is a view illustrating phase shift amounts of a-Si:H pillars with respect to near-infrared light having a wavelength of 700 nm when the pillars arranged at a distance of 300 nm between the centers thereof are different in diameter and height. In addition, FIG. 3 is a view illustrating transmissions of pillars with respect to near-infrared light having a wavelength of 700 nm when the pillars are different in diameter and height.

In the drawings (even-numbered drawings) illustrating phase shift amounts among FIGS. 2 to 19, the color changes from black to white as the phase shift amount changes from −π to π. In addition, in the drawings (odd-numbered drawings) illustrating transmissions among FIGS. 2 to 19, the color changes from black to white as the transmission changes from 0 to 1.

As illustrated in FIG. 2, in a region 101 where heights of pillars are in the range of 300 to 400 nm and diameters of pillars are in the range of 100 to 200 nm, there is a region including pillars having phase shift amounts from −π to π while having a uniform height in a relationship of a monotonically increasing function. In addition, as illustrated in FIG. 3, in the region 101, an average transmission is 90 or more, and an average transmission in a region including pillars having a uniform height in a relationship of a monotonically increasing function is 90% or more.

[When Wavelength is 750 nm]

Figure 4:
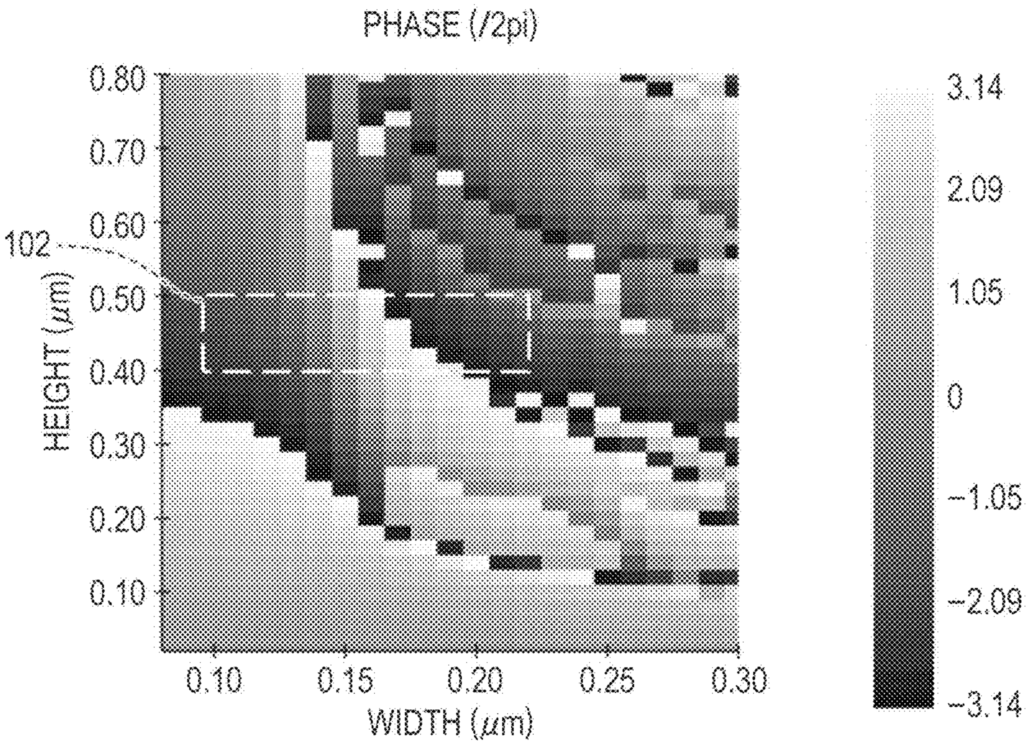
FIG. 4 is a view illustrating phase shift amounts of a-Si:H pillars with respect to near-infrared light having a wavelength of 750 nm when the pillars arranged at a distance of 350 nm between the centers thereof are different in diameter and height.
Figure 5:
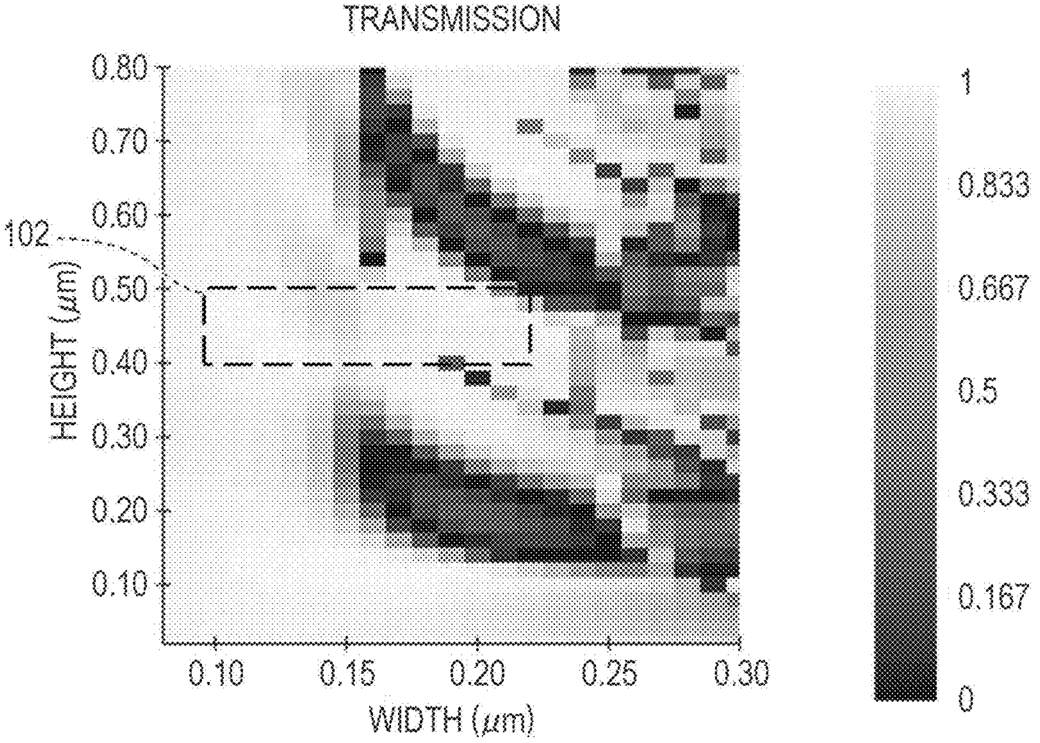
FIG. 5 is a view illustrating transmissions of a-Si:H pillars with respect to near-infrared light having a wavelength of 750 nm when the pillars arranged at a distance of 350 nm between the centers thereof are different in diameter and height.

FIG. 4 is a view illustrating phase shift amounts of a-Si:H pillars arranged at a distance of 350 nm between the centers thereof with respect to near-infrared light having a wavelength of 750 nm. FIG. 5 is a view illustrating transmissions of a-Si:H pillars with respect to near-infrared light having a wavelength of 750 nm when the pillars arranged at a distance of 350 nm between the centers thereof are different in diameter and height.

As illustrated in FIG. 4, in a region 102 where heights of pillars are in the range of 400 to 500 nm and diameters of pillars are in the range of 100 to 220 nm, there is a region including pillars having phase shift amounts from −π to π while having a uniform height in a relationship of a monotonically increasing function. In addition, as illustrated in FIG. 5, in the region 102, an average transmission is 90% or more, and an average transmission in a region including pillars having a uniform height in a relationship of a monotonically increasing function is 90% or more.

Figure 6:
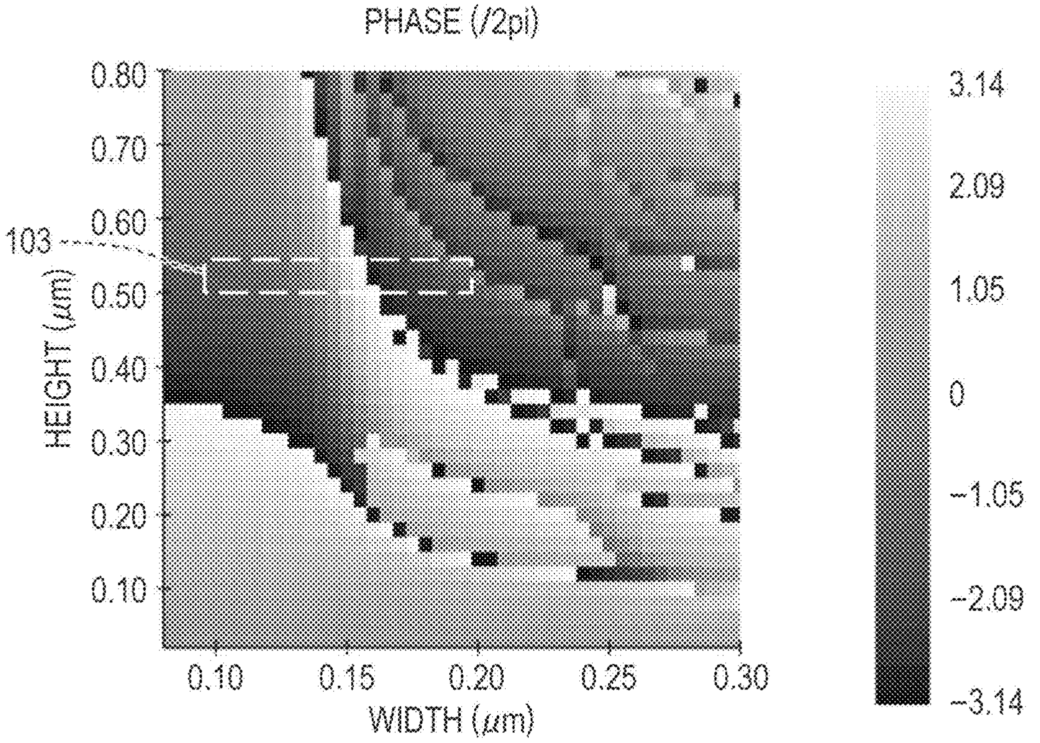
FIG. 6 is a view illustrating phase shift amounts of a-Si:H pillars with respect to near-infrared light having a wavelength of 750 nm when the pillars arranged at a distance of 400 nm between the centers thereof are different in diameter and height.
Figure 7:
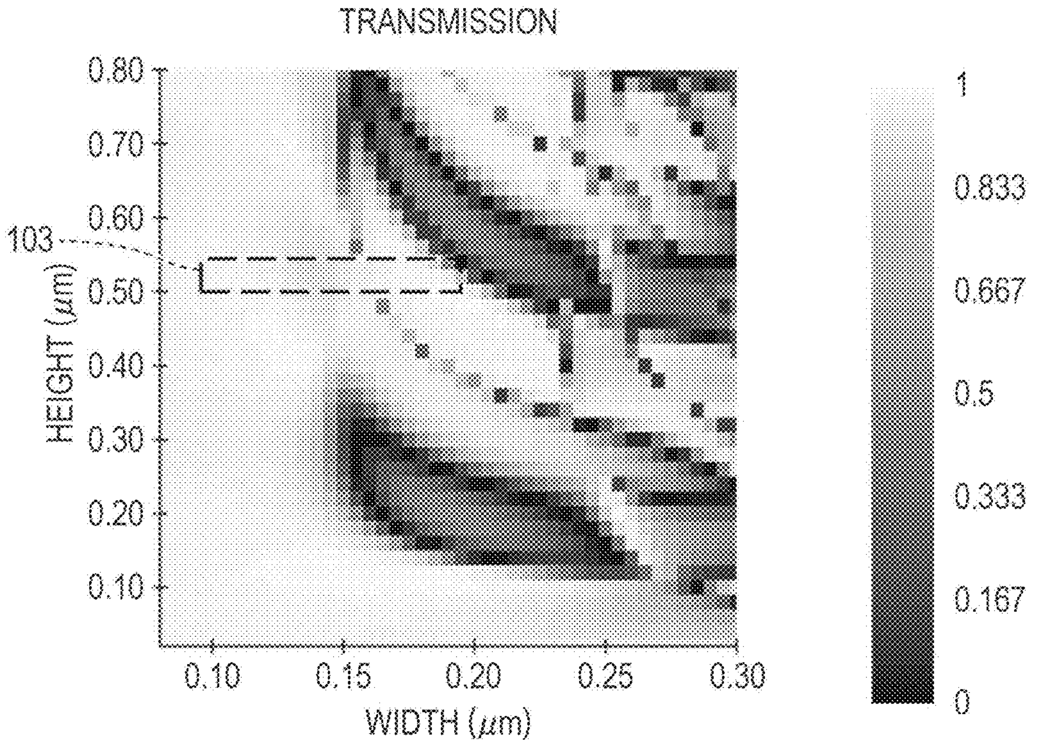
FIG. 7 is a view illustrating transmissions of a-Si:H pillars with respect to near-infrared light having a wavelength of 750 nm when the pillars arranged at a distance of 400 nm between the centers thereof are different in diameter and height.

In addition, FIG. 6 is a view illustrating phase shift amounts of a-Si:H pillars with respect to near-infrared light having a wavelength of 750 nm when the pillars arranged at a distance of 400 nm between the centers thereof are different in diameter and height. FIG. 7 is a view illustrating transmissions of a-Si:H pillars with respect to near-infrared light having a wavelength of 750 nm when the pillars arranged at a distance of 400 nm between the centers thereof are different in diameter and height.

As illustrated in FIG. 6, in a region 103 where heights of pillars are in the range of 500 to 550 nm and diameters of pillars are in the range of 100 to 200 nm, there is a region including pillars having phase shift amounts from −π to π while having a uniform height in a relationship of a monotonically increasing function. In addition, as illustrated in FIG. 7, in the region 103, an average transmission is 90% or more, and an average transmission in a region including pillars having a uniform height in a relationship of a monotonically increasing function is 90% or more.

[When Wavelength is 800 nm]

Figure 8:
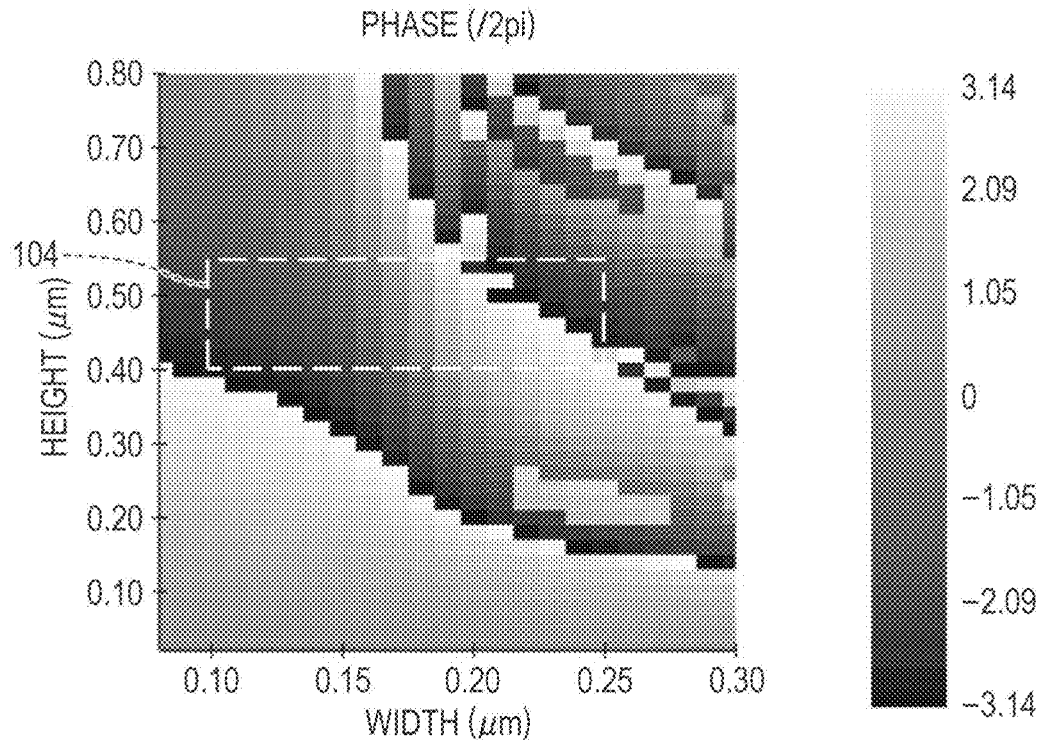
FIG. 8 is a view illustrating phase shift amounts of a-Si:H pillars with respect to near-infrared light having a wavelength of 800 nm when the pillars arranged at a distance of 350 nm between the centers thereof are different in diameter and height.
Figure 9:
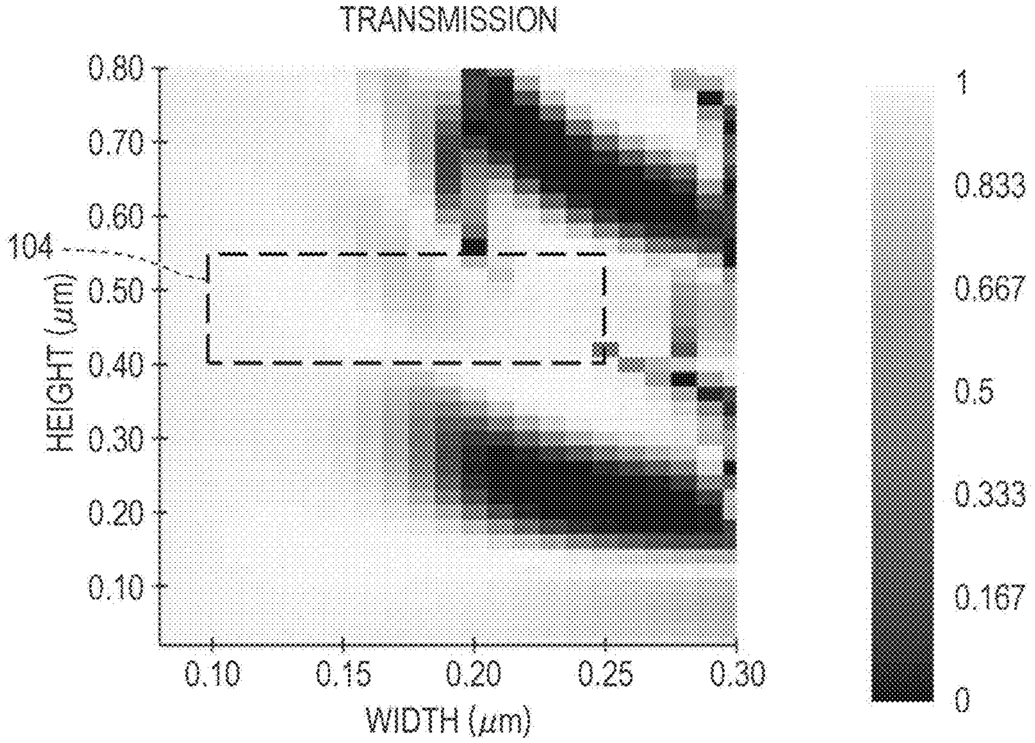
FIG. 9 is a view illustrating transmissions of a-Si:H pillars with respect to near-infrared light having a wavelength of 800 nm when the pillars arranged at a distance of 350 nm between the centers thereof are different in diameter and height.

FIG. 8 is a view illustrating phase shift amounts of a-Si:H pillars with respect to near-infrared light having a wavelength of 800 nm when the pillars arranged at a distance of 350 nm between the centers thereof are different in diameter and height. FIG. 9 is a view illustrating transmissions of a-Si:H pillars with respect to near-infrared light having a wavelength of 800 nm when the pillars arranged at a distance of 350 nm between the centers thereof are different in diameter and height.

As illustrated in FIG. 8, in a region 104 where heights of pillars are in the range of 400 to 540 nm and diameters of pillars are in the range of 100 to 250 nm, there is a region including pillars having phase shift amounts from −π to π while having a uniform height in a relationship of a monotonically increasing function. In addition, as illustrated in FIG. 9, in the region 104, an average transmission is 90% or more, and an average transmission in a region including pillars having a uniform height in a relationship of a monotonically increasing function is 90% or more.

Figure 10:
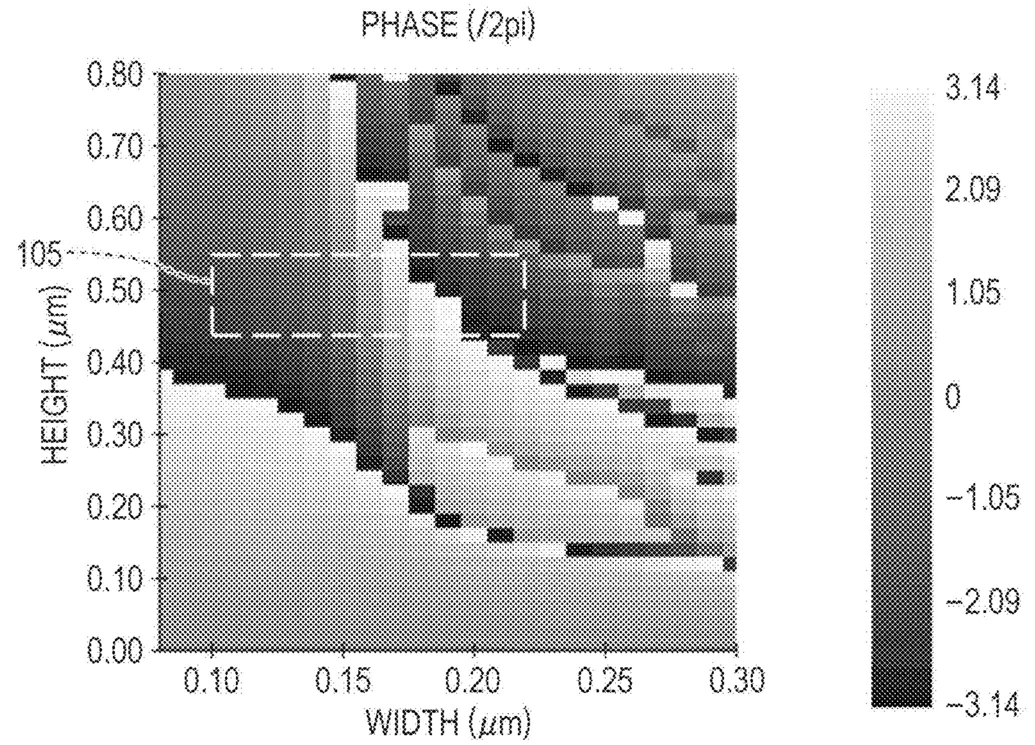
FIG. 10 is a view illustrating phase shift amounts of a-Si:H pillars with respect to near-infrared light having a wavelength of 800 nm when the pillars arranged at a distance of 400 nm between the centers thereof are different in diameter and height.
Figure 11:
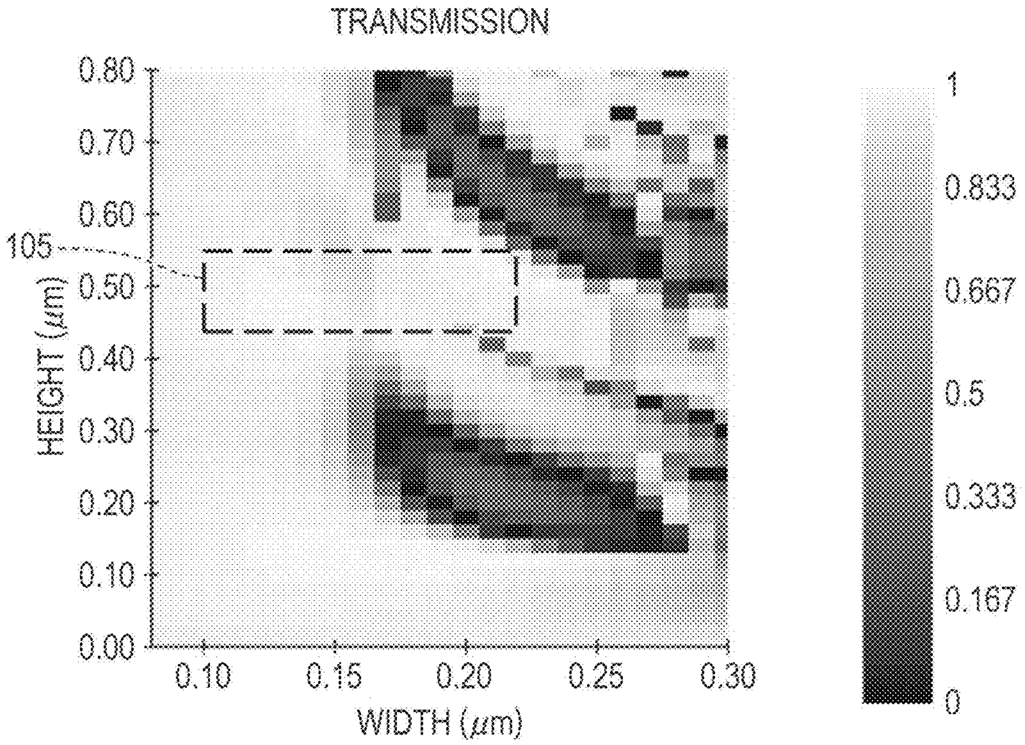
FIG. 11 is a view illustrating transmissions of a-Si:H pillars with respect to near-infrared light having a wavelength of 800 nm when the pillars arranged at a distance of 400 nm between the centers thereof are different in diameter and height.

In addition, FIG. 10 is a view illustrating phase shift amounts of a-Si:H pillars with respect to near-infrared light having a wavelength of 800 nm when the pillars arranged at a distance of 400 nm between the centers thereof are different in diameter and height. FIG. 11 is a view illustrating transmissions of a-Si:H pillars with respect to near-infrared light having a wavelength of 800 nm when the pillars arranged at a distance of 400 nm between the centers thereof are different in diameter and height.

As illustrated in FIG. 10, in a region 105 where heights of pillars are in the range of 440 to 550 nm and diameters of pillars are in the range of 100 to 220 nm, there is a region including pillars having phase shift amounts from −π to π while having a uniform height in a relationship of a monotonically increasing function. In addition, as illustrated in FIG. 11, in the region 105, an average transmission is 90, or more, and an average transmission in a region including pillars having a uniform height in a relationship of a monotonically increasing function is 90% or more.

Figure 12:
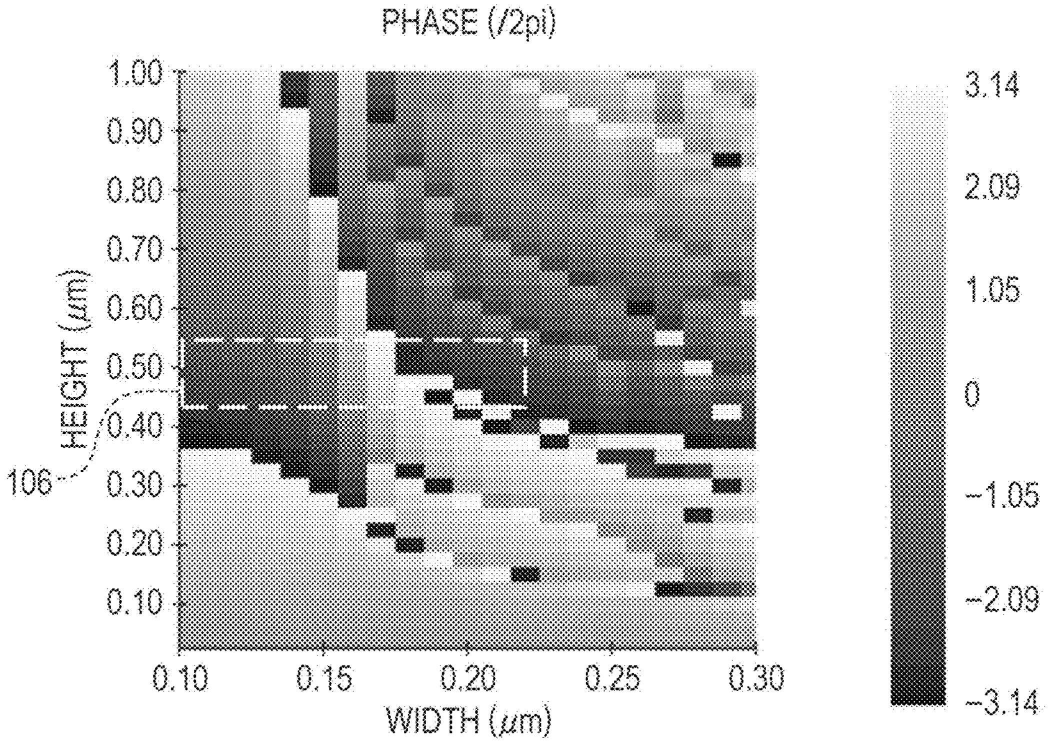
FIG. 12 is a view illustrating phase shift amounts of a-Si:H pillars with respect to near-infrared light having a wavelength of 800 nm when the pillars arranged at a distance of 450 nm between the centers thereof are different in diameter and height.
Figure 13:
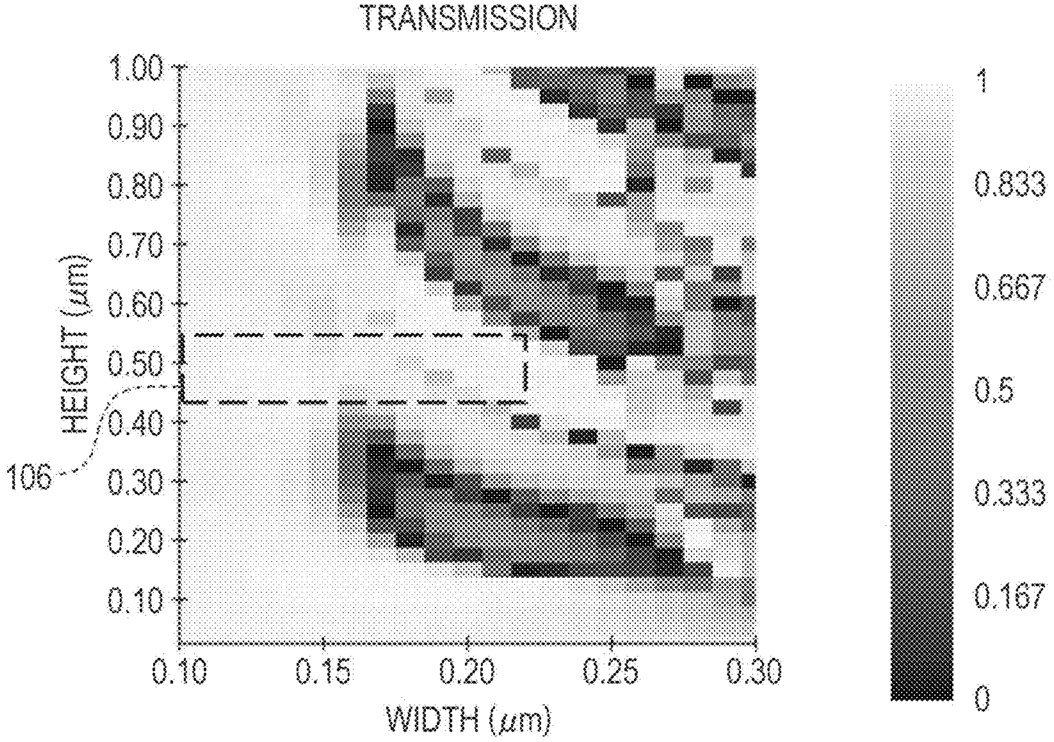
FIG. 13 is a view illustrating transmissions of a-Si:H pillars with respect to near-infrared light having a wavelength of 800 nm when the pillars arranged at a distance of 450 nm between the centers thereof are different in diameter and height.

In addition, FIG. 12 is a view illustrating phase shift amounts of a-Si:H pillars with respect to near-infrared light having a wavelength of 800 nm when the pillars arranged at a distance of 450 nm between the centers thereof are different in diameter and height. FIG. 13 is a view illustrating transmissions of a-Si:H pillars with respect to near-infrared light having a wavelength of 800 nm when the pillars arranged at a distance of 450 nm between the centers thereof are different in diameter and height.

As illustrated in FIG. 12, in a region 106 where heights of pillars are in the range of 450 to 550 nm and diameters of pillars are in the range of 100 to 220 nm, there is a region including pillars having phase shift amounts from −π to π while having a uniform height in a relationship of a monotonically increasing function. In addition, as illustrated in FIG. 13, in the region 106, an average transmission is 90 or more, and an average transmission in a region including pillars having a uniform height in a relationship of a monotonically increasing function is 90% or more.

[When Wavelength is 850 nm]

Figure 14:
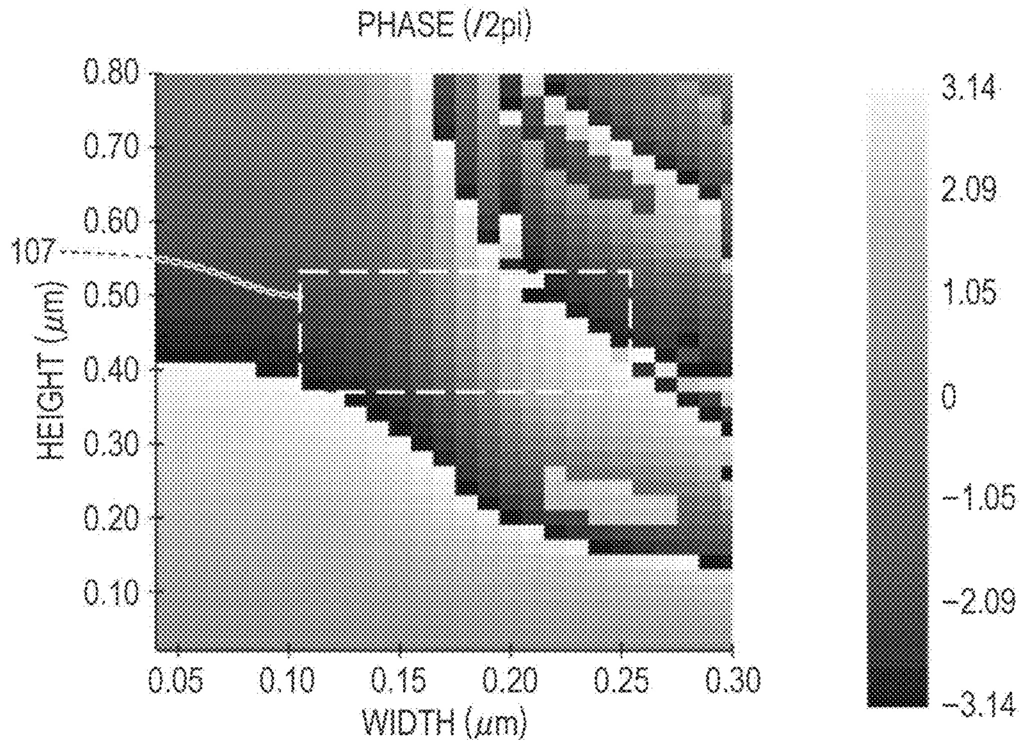
FIG. 14 is a view illustrating phase shift amounts of a-Si:H pillars with respect to near-infrared light having a wavelength of 850 nm when the pillars arranged at a distance of 350 nm between the centers thereof are different in diameter and height.
Figure 15:
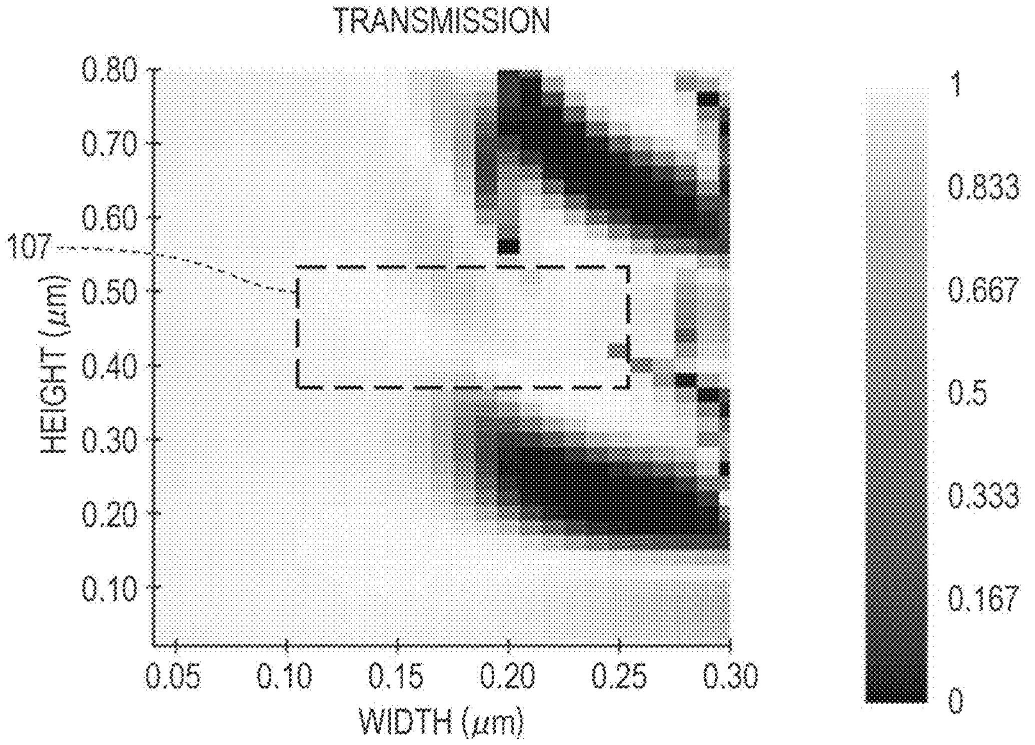
FIG. 15 is a view illustrating transmissions of a-Si:H pillars with respect to near-infrared light having a wavelength of 850 nm when the pillars arranged at a distance of 350 nm between the centers thereof are different in diameter and height.

FIG. 14 is a view illustrating phase shift amounts of a-Si:H pillars with respect to near-infrared light having a wavelength of 850 nm when the pillars arranged at a distance of 350 nm between the centers thereof are different in diameter and height. FIG. 15 is a view illustrating transmissions of a-Si:H pillars with respect to near-infrared light having a wavelength of 850 nm when the pillars arranged at a distance of 350 nm between the centers thereof are different in diameter and height.

As illustrated in FIG. 14, in a region 107 where heights of pillars are in the range of 380 to 540 nm and diameters of pillars are in the range of 100 to 250 nm, there is a region including pillars having phase shift amounts from −π to π while having a uniform height in a relationship of a monotonically increasing function. In addition, as illustrated in FIG. 15, in the region 107, an average transmission is 90% or more, and an average transmission in a region including pillars having a uniform height in a relationship of a monotonically increasing function is 90% or more.

Figure 16:
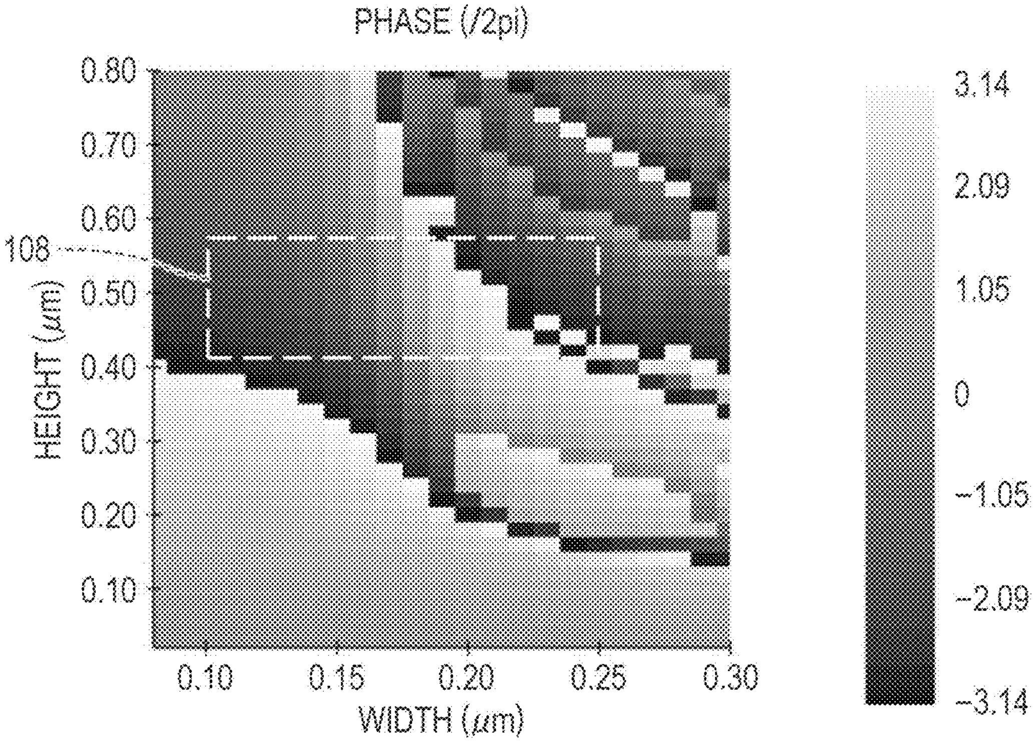
FIG. 16 is a view illustrating phase shift amounts of a-Si:H pillars with respect to near-infrared light having a wavelength of 850 nm when the pillars arranged at a distance of 400 nm between the centers thereof are different in diameter and height.
Figure 17:
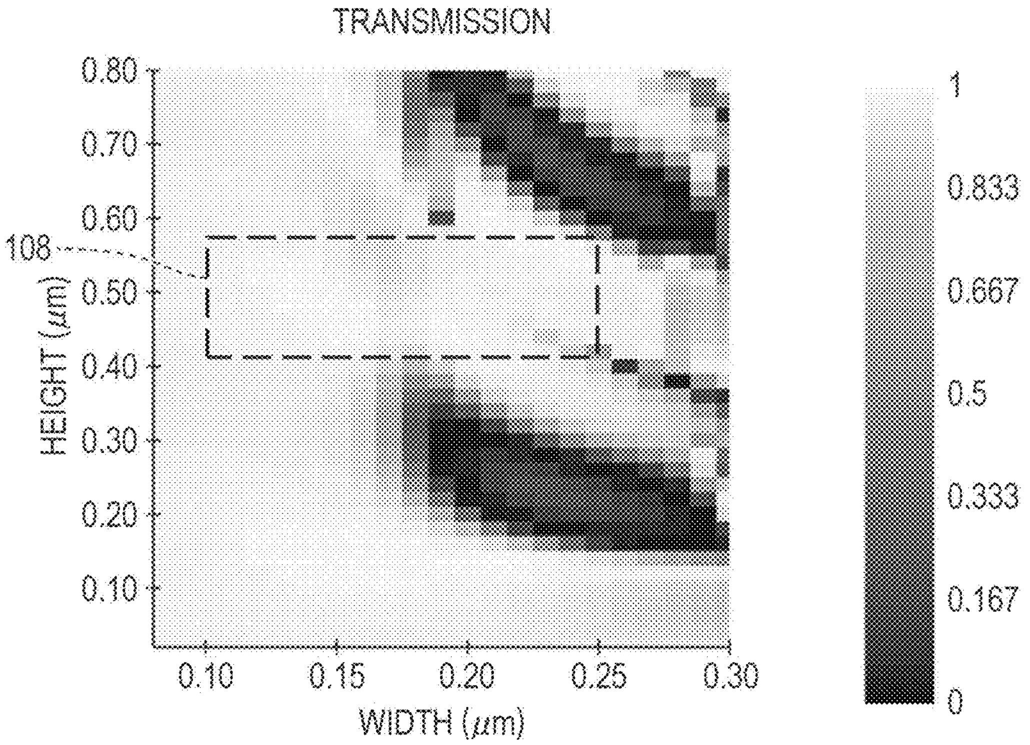
FIG. 17 is a view illustrating transmissions of a-Si:H pillars with respect to near-infrared light having a wavelength of 850 nm when the pillars arranged at a distance of 400 nm between the centers thereof are different in diameter and height.

In addition, FIG. 16 is a view illustrating phase shift amounts of a-Si:H pillars with respect to near-infrared light having a wavelength of 850 nm when the pillars arranged at a distance of 400 nm between the centers thereof are different in diameter and height. FIG. 17 is a view illustrating transmissions of a-Si:H pillars with respect to near-infrared light having a wavelength of 850 nm when the pillars arranged at a distance of 400 nm between the centers thereof are different in diameter and height.

As illustrated in FIG. 16, in a region 108 where heights of pillars are in the range of 420 to 580 nm and diameters of pillars are in the range of 100 to 250 nm, there is a region including pillars having phase shift amounts from −π to π while having a uniform height in a relationship of a monotonically increasing function. In addition, as illustrated in FIG. 17, in the region 108, an average transmission is 90% or more, and an average transmission in a region including pillars having a uniform height in a relationship of a monotonically increasing function is 90% or more.

Figure 18:
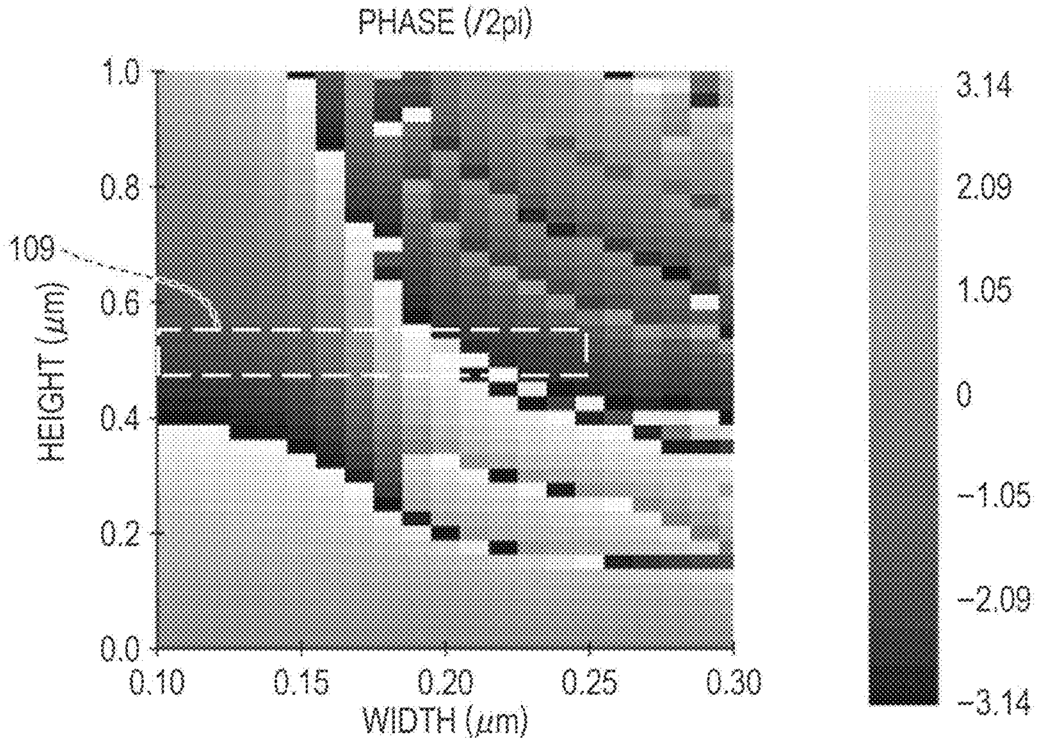
FIG. 18 is a view illustrating phase shift amounts of a-Si:H pillars with respect to near-infrared light having a wavelength of 850 nm when the pillars arranged at a distance of 450 nm between the centers thereof are different in diameter and height.
Figure 19:
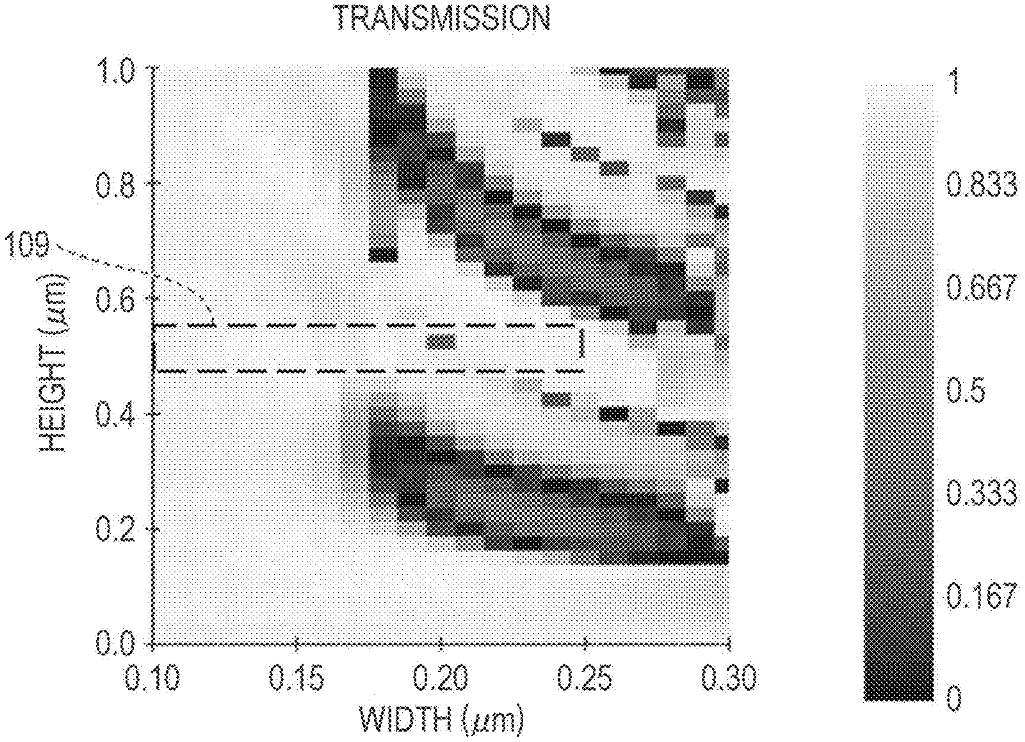
FIG. 19 is a view illustrating transmissions of a-Si:H pillars with respect to near-infrared light having a wavelength of 850 nm when the pillars arranged at a distance of 450 nm between the centers thereof are different in diameter and height.

In addition, FIG. 18 is a view illustrating phase shift amounts of a-Si:H pillars with respect to near-infrared light having a wavelength of 850 nm when the pillars arranged at a distance of 450 nm between the centers thereof are different in diameter and height. FIG. 19 is a view illustrating transmissions of a-Si:H pillars with respect to near-infrared light having a wavelength of 850 nm when the pillars arranged at a distance of 450 nm between the centers thereof are different in diameter and height.

As illustrated in FIG. 18, in a region 109 where heights of pillars are in the range of 480 to 560 nm and diameters of pillars are in the range of 100 to 250 nm, there is a region including pillars having phase shift amounts from −π to π while having a uniform height in a relationship of a monotonically increasing function. In addition, as illustrated in FIG. 19, in the region 109, an average transmission is 90% or more, and an average transmission in a region including pillars having a uniform height in a relationship of a monotonically increasing function is 90% or more.

From the above-described results, it can be seen that there is a region in which a-Si:H pillars having a uniform height satisfy a high transmission and a phase delay condition of 0 to 2 n in the near-infrared light region.

[Simulation 2]

A model of a meta-lens including a-Si:H pillars based on the above-described simulation results was created, and a simulation of light condensing of the meta-lens was performed. For comparison, a model of a meta-lens including pillars of amorphous silicon (hereinafter, also simply referred to as "a-Si") was created, and a similar simulation of light condensing was performed.

Here, as a result of designing meta-lenses that are optimum for respective compositions of a-Si and a-Si:H films, and obtaining transmissions of the meta-lenses with respect to light having a wavelength of 800 nm, the transmission of the meta-lens having a hydrogen content of 0 atom % (that is, a-Si) was 40%. The transmission of the meta-lens having a hydrogen content of about 8 to 25 atom % was 90%. The hydrogen concentration (ratio with respect to Si atoms) in the a-Si:H film is preferably 8 atom % or more and 25 atoms or less, and more preferably 10 atoms or more and 20 atom % or less. Therefore, in the simulation in the present embodiment, the hydrogen content of a-Si:H is 15 atom. The hydrogen content was measured by Rutherford backscattering spectrometry (RBS) and hydrogen forward scattering spectrometry (HFS).

[Condensing Meta-Lens]

Based on the results of the simulation 1 described above, in order to create a model of a meta-lens, an optimum arrangement of pillars was calculated using the following equation: where "f" is a focal length of the meta-lens and "A" is a wavelength of light transmitted through the meta-lens. In this simulation, "f" was 100 μm, and "λ" was 800 nm. The meta-lens has a diameter of 50 μm.

$$\varphi(x, y) = 2\pi \Big/ \lambda\left(f - \sqrt{f^2 + x^2 + y^2}\right) \quad \text{[Equation 1]}$$

Figure 20:
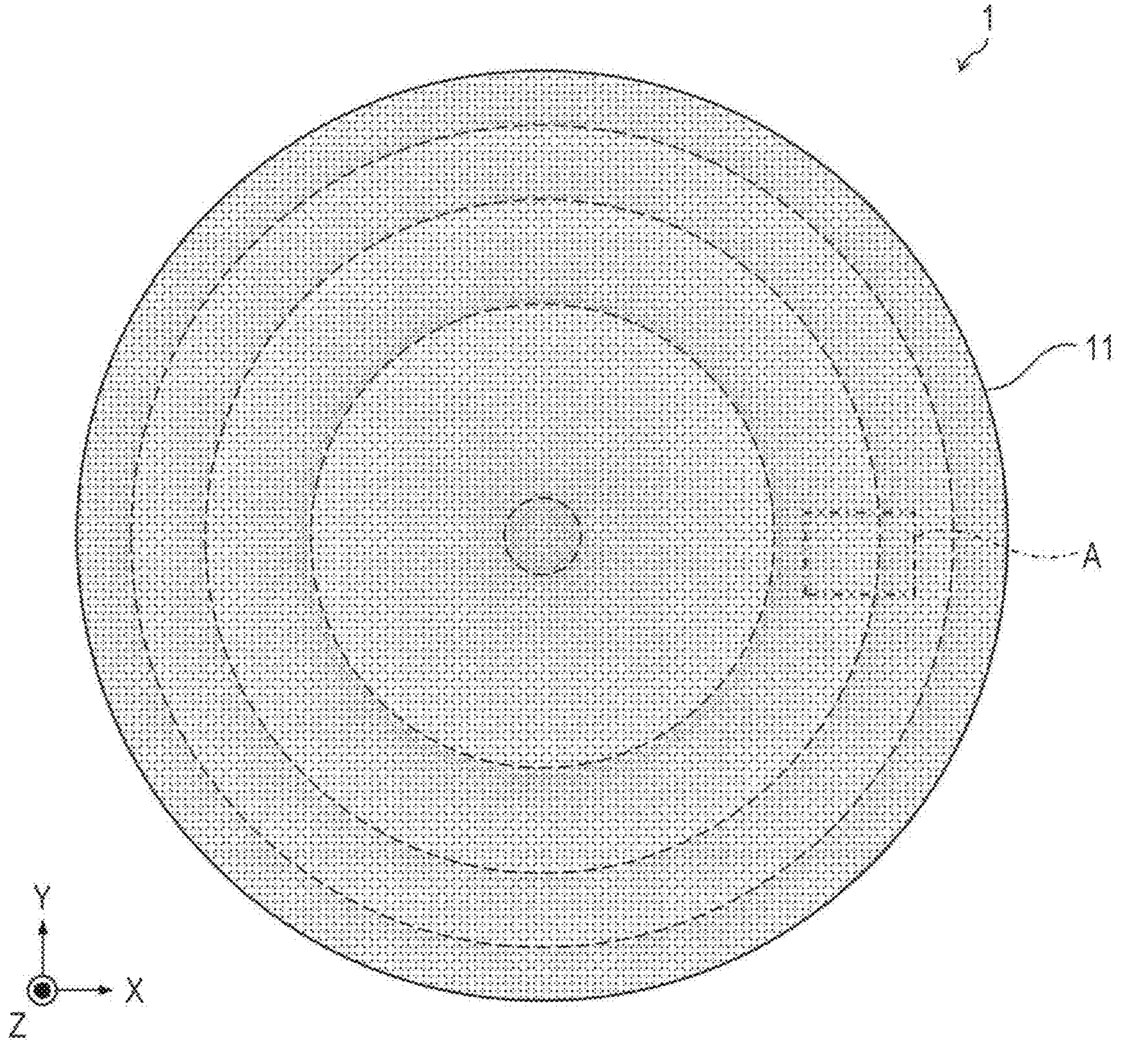
FIG. 20 is a view schematically illustrating a configuration of a meta-lens used in a simulation.
Figure 21:
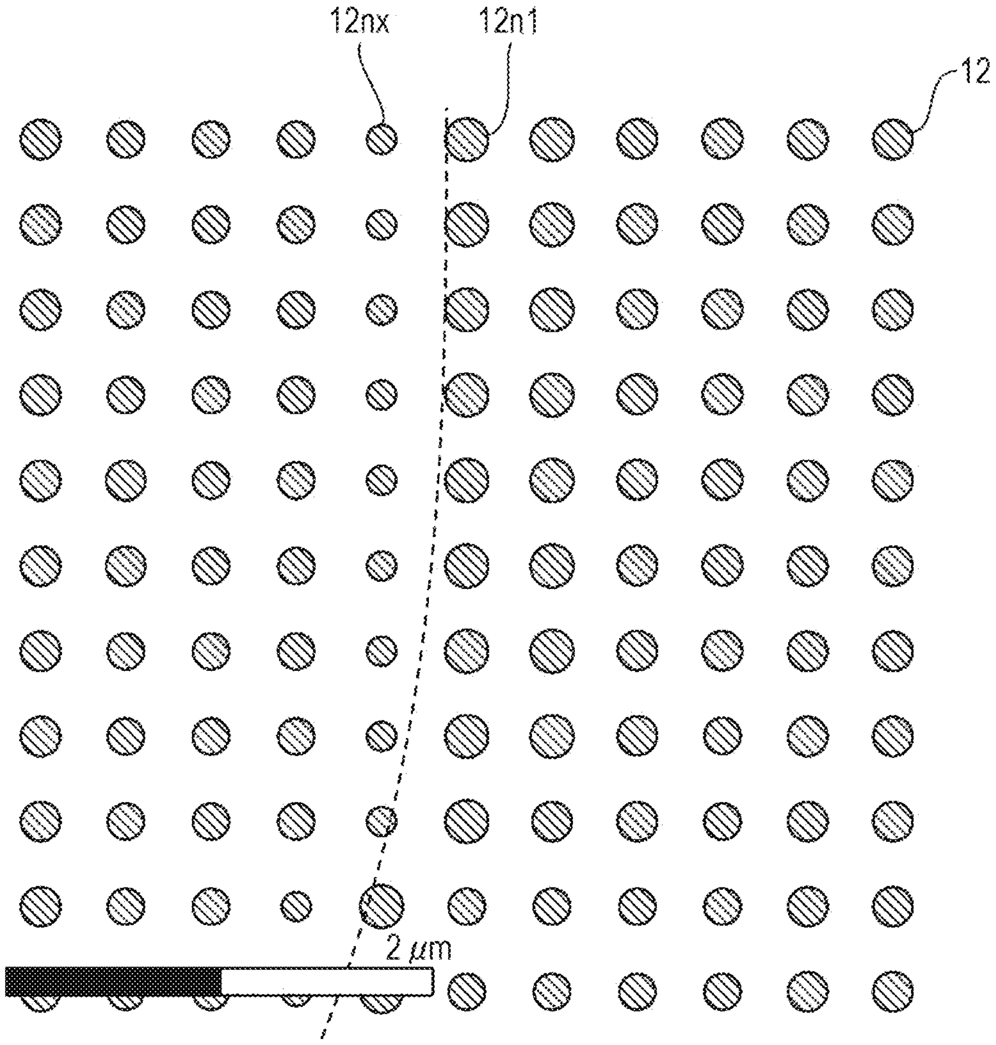
FIG. 21 is an enlarged view of a portion A of FIG. 20 illustrating an example of arrangement of pillars.

FIG. 21 is an enlarged view of a portion A of FIG. 20 illustrating an example of arrangement of pillars. As illustrated in FIG. 20, a meta-lens 1 includes a substrate 11 and pillars (reference sign 12) arranged on one main surface of the substrate 11. The substrate 11 is a member that allows transmission of near-infrared light having a wavelength of 700 to 850 nm therethrough, and is, for example, a glass plate having a circular planar shape.

The pillars 12 are arranged in a lattice pattern on the substrate 11. In the meta-lens 1, as indicated by a broken line in the drawings, a circular portion at the center and an annular portion outside the circular portion are set as pillar arrangement unit regions. Note that the portion A in FIG. 20 is a boundary portion between certain arrangement unit regions.

In each arrangement unit region, pillars having different phase shift amounts are arranged so that the meta-lens exhibits appropriate refractive power to function as an optical element. In each arrangement unit region, a pillar **12*n*1 having a phase shift amount of −π is located closer to the center, a pillar 12*nx* having a phase shift amount of π is located closer to the circumference, and pillars (12*n*2, 12*n*3, . . . , 12***n*(*x*−2), and 12*n*(*x*−1)) having different phase shift amounts are arranged such that the phase shift amount gradually increases from the center toward the circumference. Therefore, as the length of the arrangement unit region in the radial direction of the meta-lens 1 is shorter, the change in phase shift amount of the pillar 12 in the radial direction becomes larger, exhibiting larger refractive power.

In the condensing meta-lens 1, all the pillars 12 are made of a-Si:H. In addition, all the pillars 12 in the meta-lens 1 have a height of 500 nm. Furthermore, the pillars 12 are away from each other at an equal distance of 400 nm between the centers thereof. Meanwhile, the pillars 12 have diameters that are different in the range of 100 to 240 nm depending on the phase shift amounts. The meta-lens 1 function as a condenser lens spreading on an XY plane with the optical axis direction as the Z-axis direction.

For comparison, a comparative model of a condensing meta-lens was also created in such a manner that pillars made of a-Si having the same dimensions as the meta-lens 1 were arranged at the same distance between the centers of the pillars as the meta-lens 1.

[Conditions of Simulation]

In each of the meta-lens 1 including pillars made of a-Si:H and the comparative meta-lens including pillars made of a-Si, a light condensing intensity was obtained when near-infrared light having a wavelength of 800 nm was transmitted.

Figure 22:
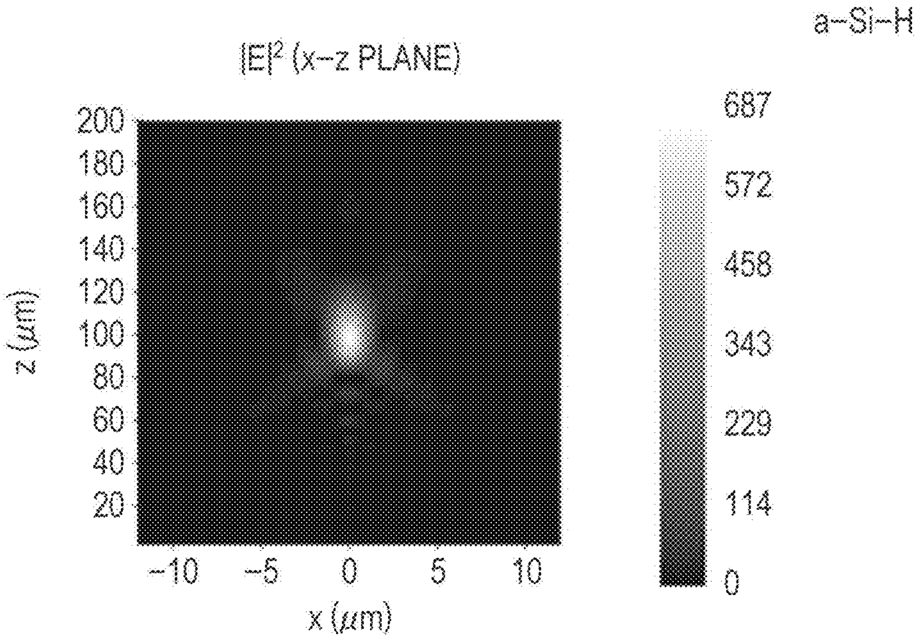
FIG. 22 is a view illustrating an electric field intensity distribution at a focal spot on an XZ plane (Y=0) of a meta-lens including pillars made of a-Si:H when near-infrared light having a wavelength of 800 nm was transmitted.
Figure 23:
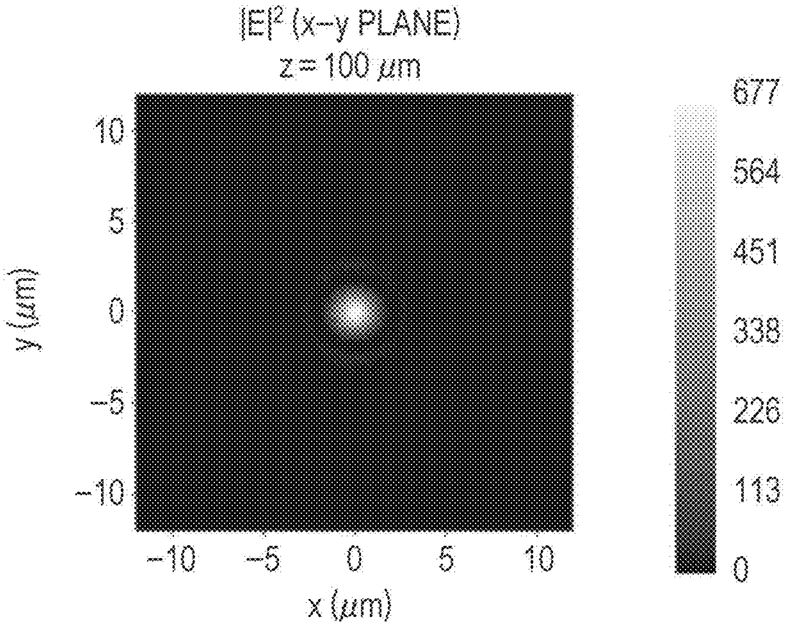
FIG. 23 is a view illustrating an electric field intensity distribution at a focal spot on an XY plane (Z=100 μm) of a meta-lens including pillars made of a-Si:H when near-infrared light having a wavelength of 800 nm was transmitted.
Figure 24:
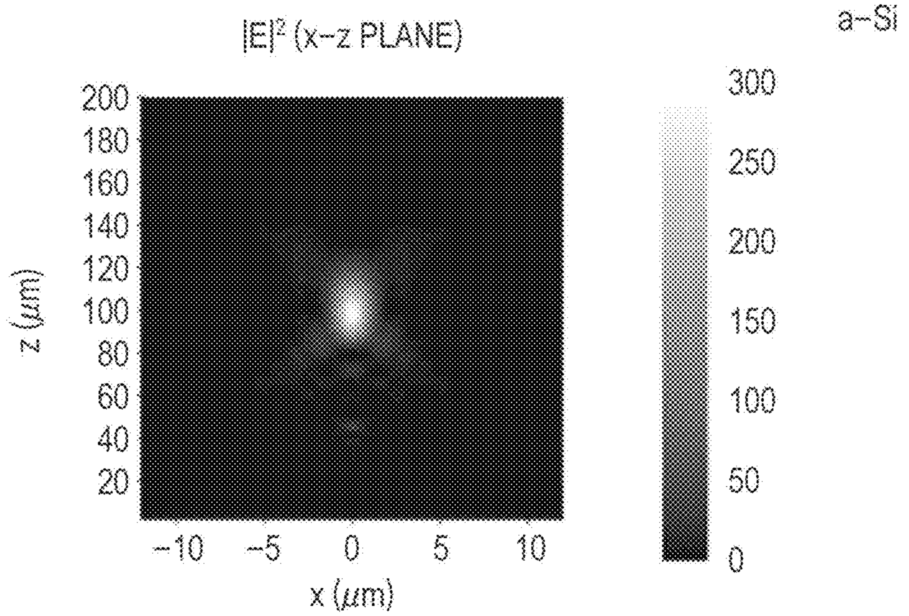
FIG. 24 is a view illustrating an electric field intensity distribution at a focal spot on an XZ plane (Y=0) of a comparative meta-lens including pillars made of a-Si when near-infrared light having a wavelength of 800 nm was transmitted.
Figure 25:
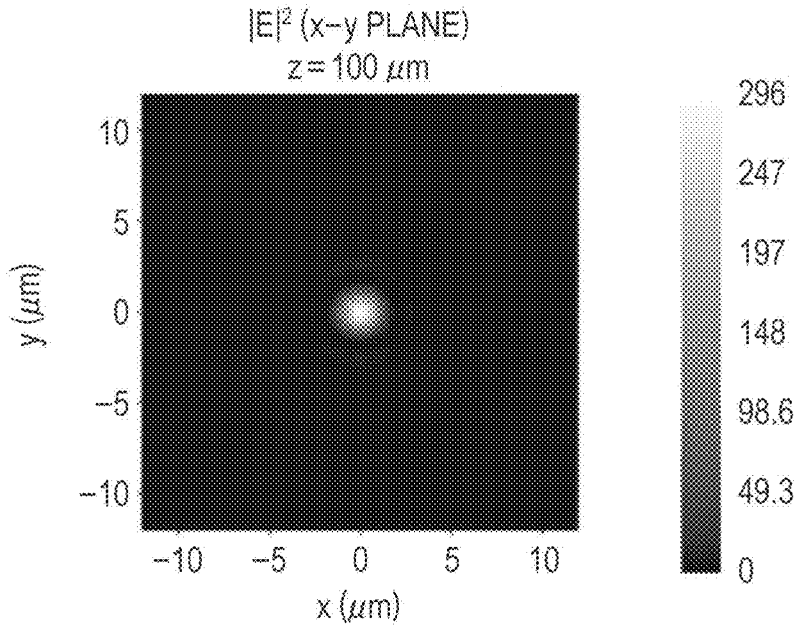
FIG. 25 is a view illustrating an electric field intensity distribution at a focal spot on an XY plane (Z=100 μm) of a comparative meta-lens including pillars made of a-Si when near-infrared light having a wavelength of 800 nm was transmitted.
Figure 26:
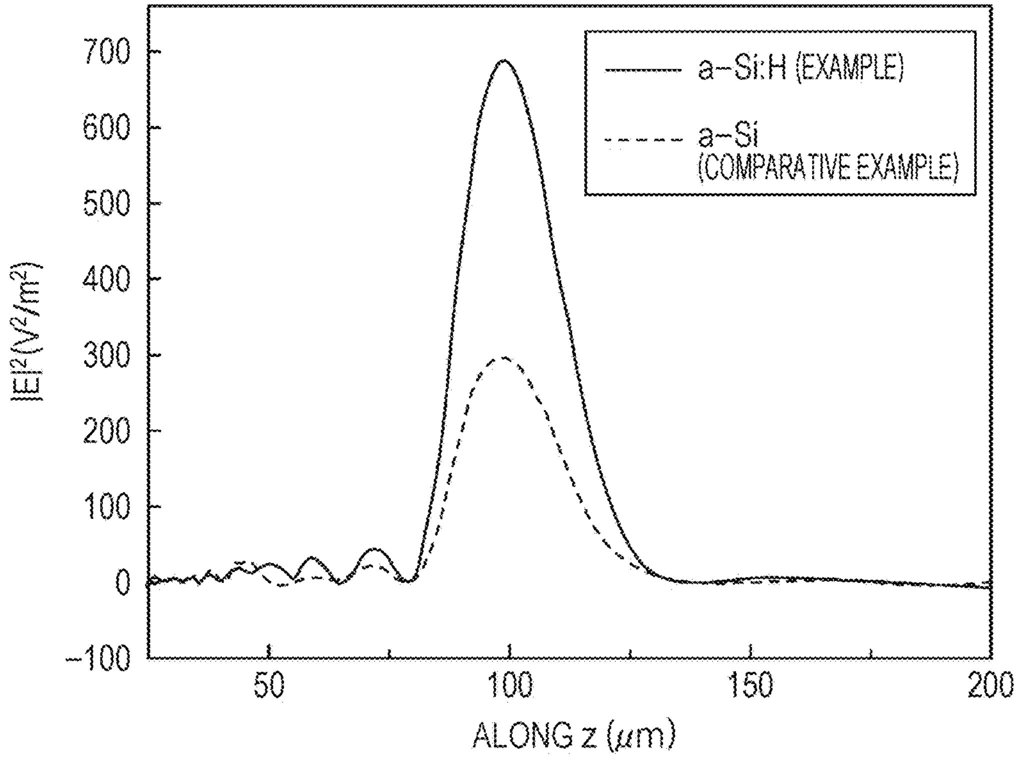
FIG. 26 is a view illustrating an example of an intensity at a focal spot on a Z axis (X=Y=0) of each of a condensing meta-lens (solid line) in which pillars made of a-Si:H were arranged and a comparative condensing meta-lens (broken line) in which pillars made of a-Si were arranged when near-infrared light having a wavelength of 800 nm was transmitted.
Figure 27:
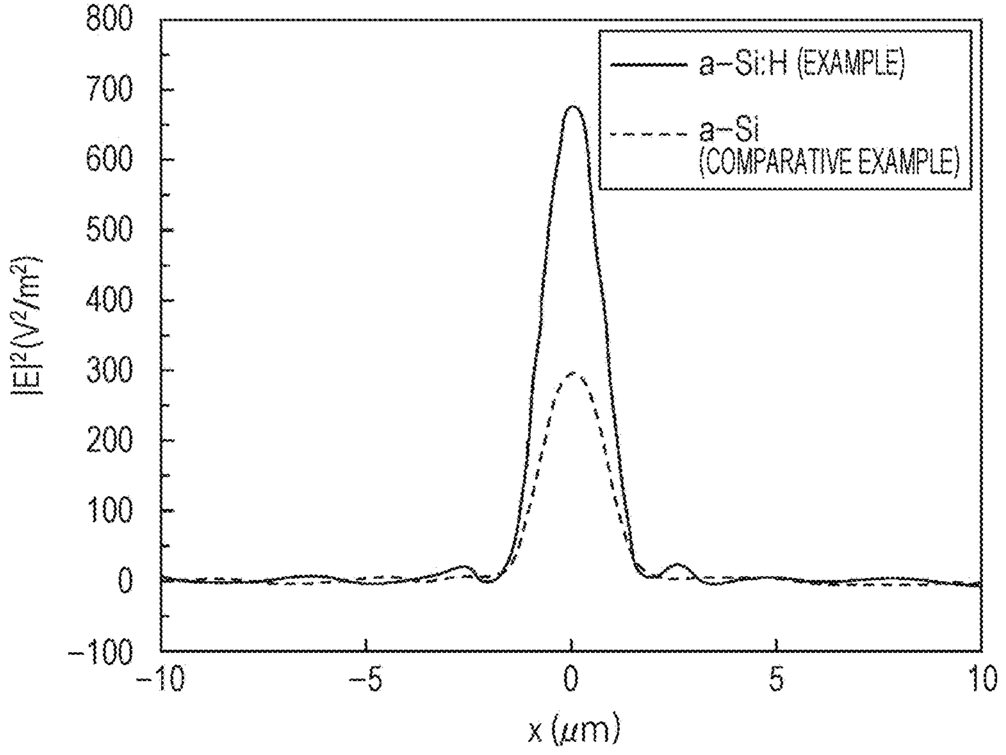
FIG. 27 is a view illustrating an example of an intensity at a focal spot on an X axis (Y=0 and Z=100 μm) of each of a condensing meta-lens (solid line) in which pillars made of a-Si:H were arranged and a comparative condensing meta-lens (broken line) in which pillars made of a-Si were arranged when near-infrared light having a wavelength of 800 nm was transmitted.

FIG. 22 is a view illustrating an electric field intensity distribution on an XZ plane of the meta-lens including pillars made of a-Si:H when near-infrared light having a wavelength of 800 nm was transmitted. FIG. 23 is a view illustrating an electric field intensity distribution on an XY plane of the meta-lens including pillars made of a-Si:H when near-infrared light having a wavelength of 800 nm was transmitted. FIG. 24 is a view illustrating an electric field intensity distribution on an XZ plane of the comparative meta-lens including pillars made of a-Si when near-infrared light having a wavelength of 800 nm was transmitted. FIG. 25 is a view illustrating an electric field intensity distribution on an XY plane of the comparative meta-lens including pillars made of a-Si when near-infrared light having a wavelength of 800 nm was transmitted. FIG. 26 is a view illustrating an example of a distance from the meta-lens and an electric field intensity at a focal spot on the Z axis of each of the meta-lens 1 (solid line) and the comparative meta-lens (broken line) when near-infrared light having a wavelength of 800 nm was transmitted. Here, the Z axis is an axis on a plane of X=Y=0 in the XYZ coordinate system. FIG. 27 is a view illustrating an example of a distance from the optical axis and an electric field intensity of a focal spot on the X axis of each of the meta-lens 1 (solid line) and the comparative meta-lens (broken line) when near-infrared light having a wavelength of 800 nm was transmitted. Here, the X axis is an axis on a plane of Y=0 and Z=100 (μm) in the XYZ coordinate system.

As illustrated in FIGS. 26 and 27, both of the meta-lens 1 and the comparative meta-lens collect near-infrared light having a wavelength of 800 nm at a position of 100 μm from the meta-lens on the Z axis, but the light condensing efficiency of the meta-lens 1 is twice or more greater than that of the comparative meta-lens. This is considered to be because the a-Si:H pillars have a transmission of 90% or more with respect to near-infrared light in a region where the phase shift amount changes from $-\pi$ to $\pi$ in a relationship of a monotonically increasing function in which the pillars have diameters with a uniform height, whereas the a-Si pillars have an average transmission (e.g. about 20% as will be described below) of much less than 90% with respect to near-infrared light in a region having the relationship of the monotonically increasing function.

Figure 28:
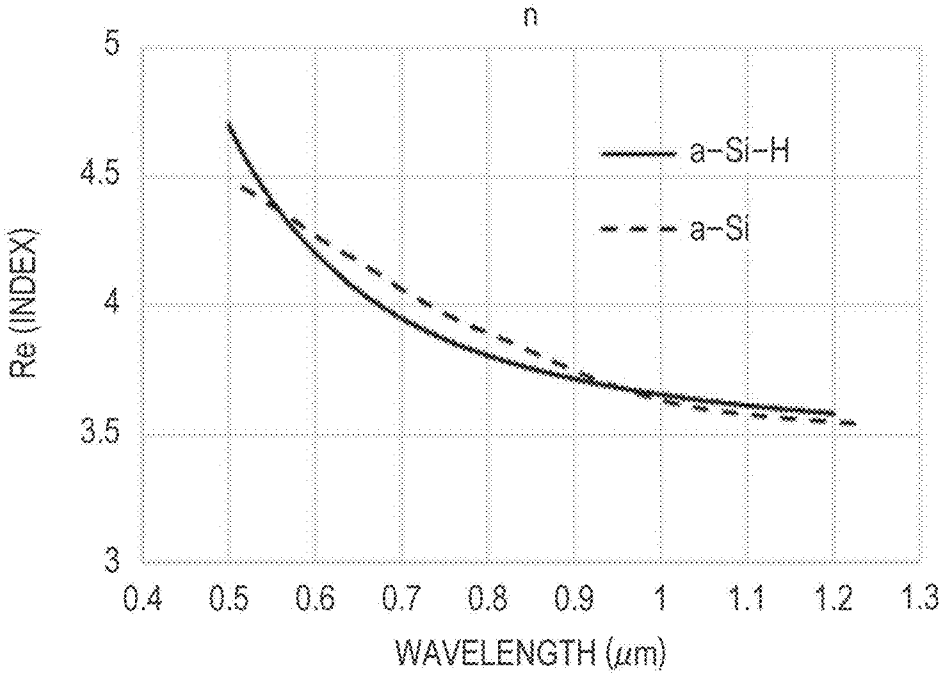
FIG. 28 is a graph illustrating real parts (refractive indexes) of refractive indexes of an a-Si:H film (solid line) and a comparative a-Si film (broken line) in the wavelength region of near-infrared light.
Figure 29:
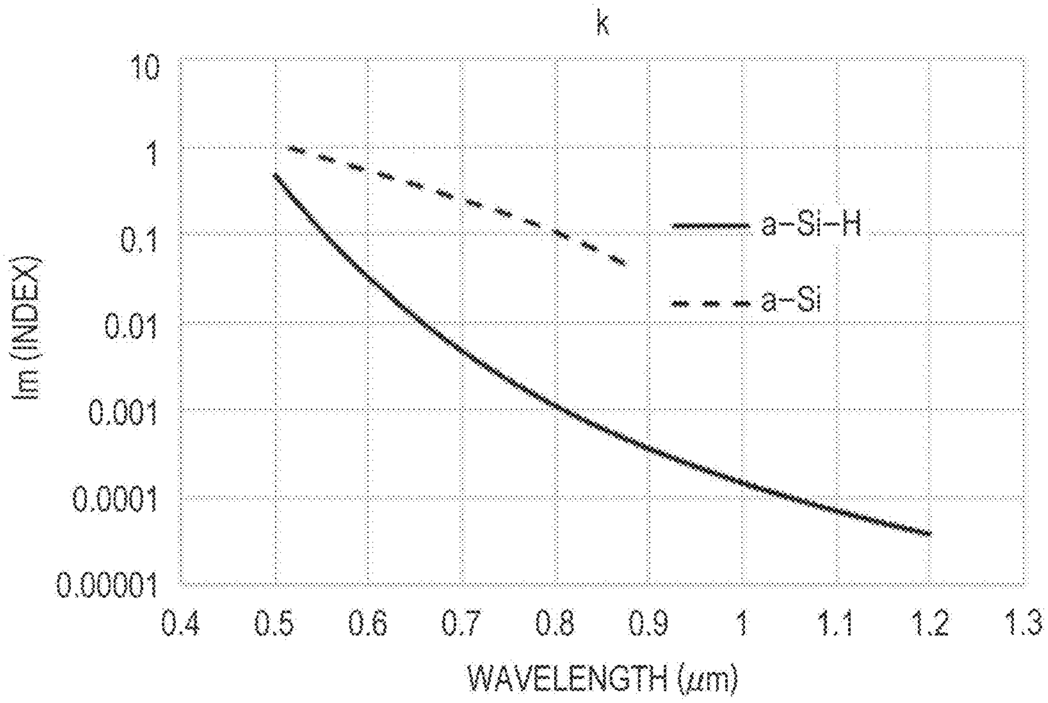
FIG. 29 is a graph illustrating imaginary parts (extinction coefficients) of refractive indexes of an a-Si:H film (solid line) and a comparative a-Si film (broken line) in the wavelength region of near-infrared light.

Here, FIG. 28 is a graph illustrating real parts (refractive indexes) of refractive indexes of the a-Si:H film (solid line) and the comparative a-Si film (broken line) in the wavelength region of near-infrared light. FIG. 29 is a graph illustrating imaginary parts (extinction coefficients) of refractive indexes of the a-Si:H film (solid line) and the comparative a-Si film (broken line) in the wavelength region of near-infrared light. From FIGS. 28 and 29, it can be seen that the real part of a-Si and the real part of a-Si:H are almost the same in the band of 700 to 850 nm. In contrast, the imaginary part of a-Si:H is smaller than the imaginary part of a-Si. Note that this measurement result is obtained by measuring the planar film of each material with a spectroscopic ellipsometer.

Figure 30:
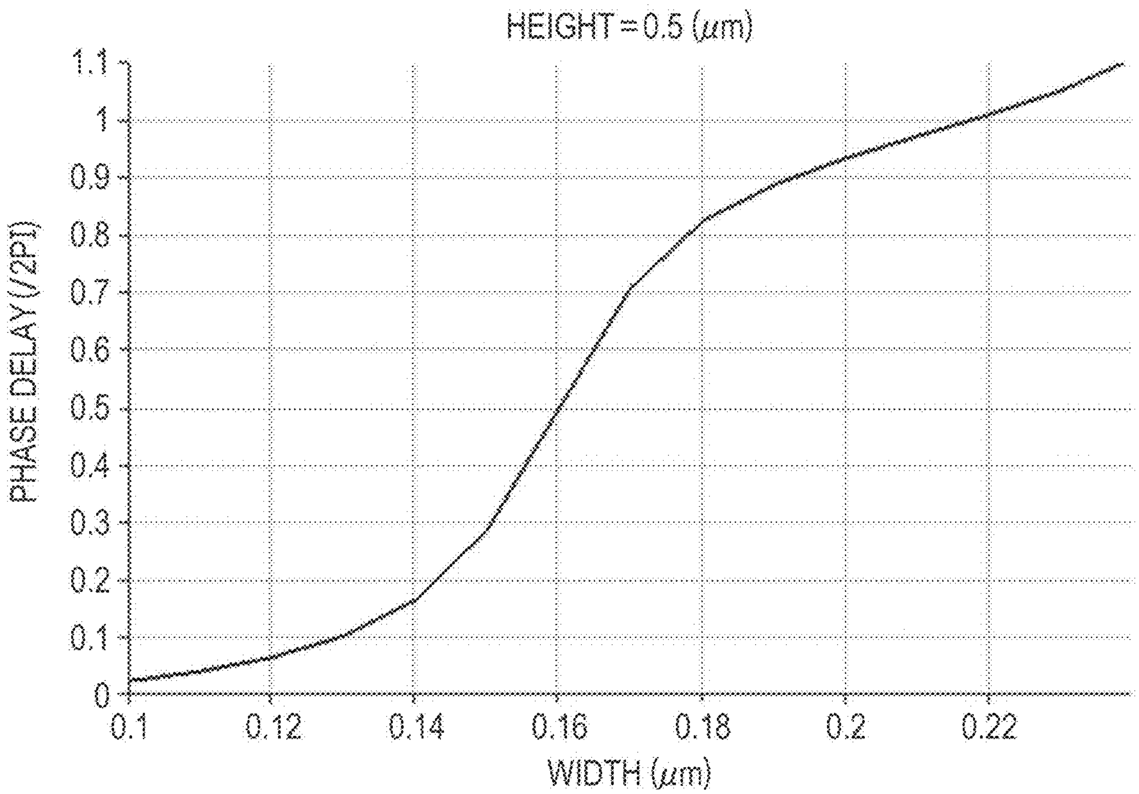
FIG. 30 is a view illustrating a phase delay with respect to a diameter of a pillar of a condensing meta-lens.
Figure 31:
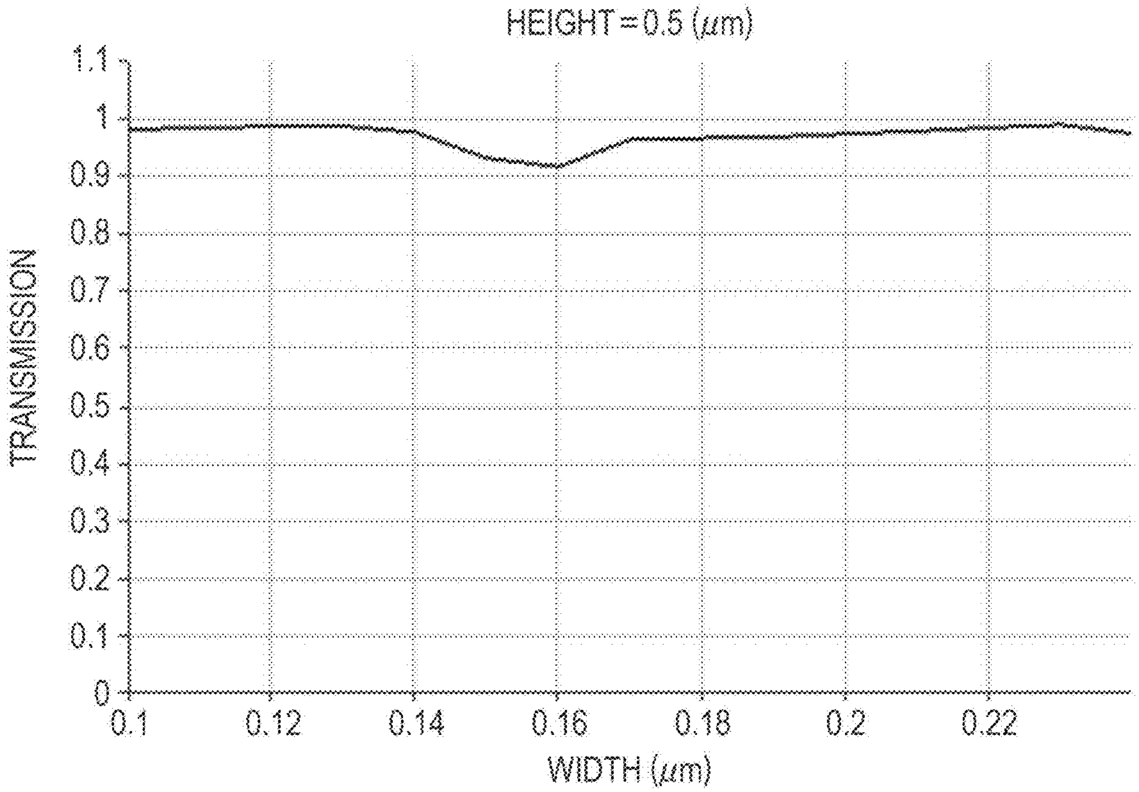
FIG. 31 is a view illustrating a transmission with respect to a diameter of a pillar of a condensing meta-lens.

Therefore, it is considered that the phase delay effect and the transmission are different between the meta-lens 1 and the comparative meta-lens. FIG. 30 is a view illustrating a phase delay with respect to a diameter of a pillar of the meta-lens 1. FIG. 31 is a view illustrating a transmission with respect to a diameter of a pillar of the meta-lens 1. In each of the meta-lens 1 and the comparative meta-lens, the wavelength of incident light was 800 nm, the distance between the centers of the pillars was 400 nm, the height of the pillars was 500 nm, and the diameters of the pillars were in the range of 100 to 300 nm. As is clear from FIGS. 30 and 31, the meta-lens 1 including a-Si:H pillars satisfies a high transmission, i.e. an average transmission of 90% or more, and a phase delay condition of 0 to 2 n when the diameters of the pillars are in the range of 100 to 240 nm (see FIGS. 10 and 11).

From the above, it can be seen that the formation of periodic structures of the meta-surface optical element using pillars made of a-Si:H makes it possible to achieve a meta-surface optical element having sufficiently high optical characteristics by appropriately arranging the pillars having different diameters with a uniform height.

Figure 32:
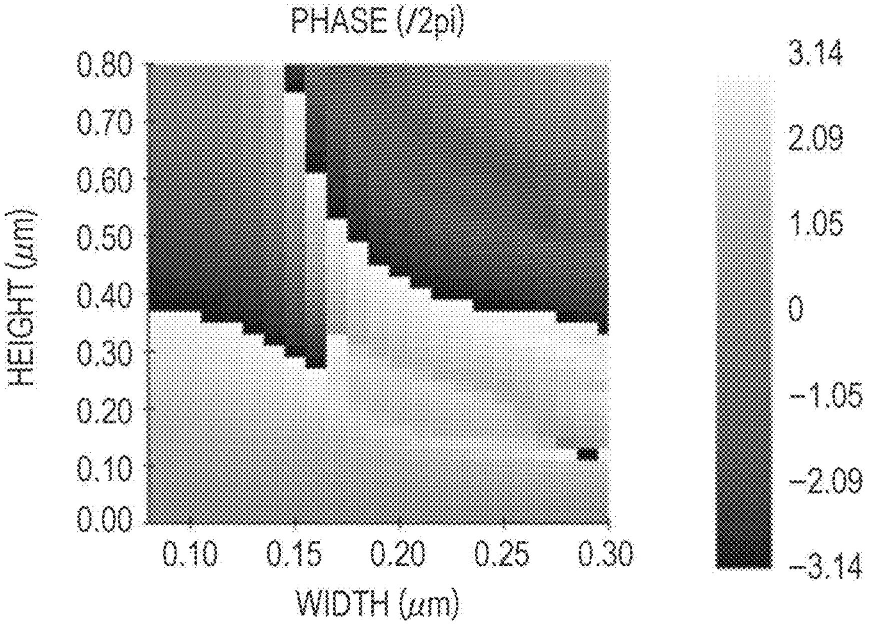
FIG. 32 is a view illustrating phase shift amounts of a-Si pillars with respect to near-infrared light having a wavelength of 800 nm when the pillars arranged at a distance of 400 nm between the centers thereof are different in diameter and height.
Figure 33:
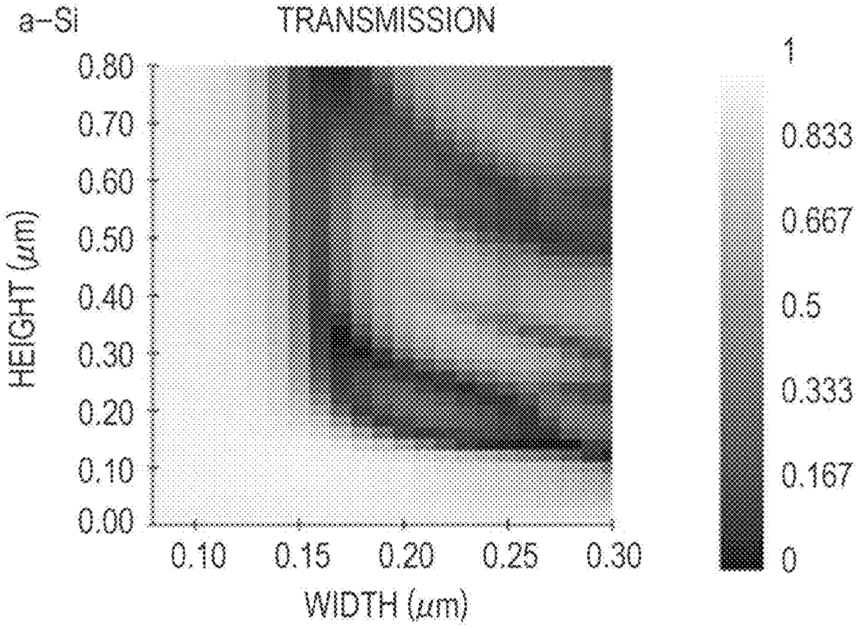
FIG. 33 is a view illustrating transmissions of a-Si pillars with respect to near-infrared light having a wavelength of 800 nm when the pillars arranged at a distance of 400 nm between the centers thereof are different in diameter and height.
Figure 34:
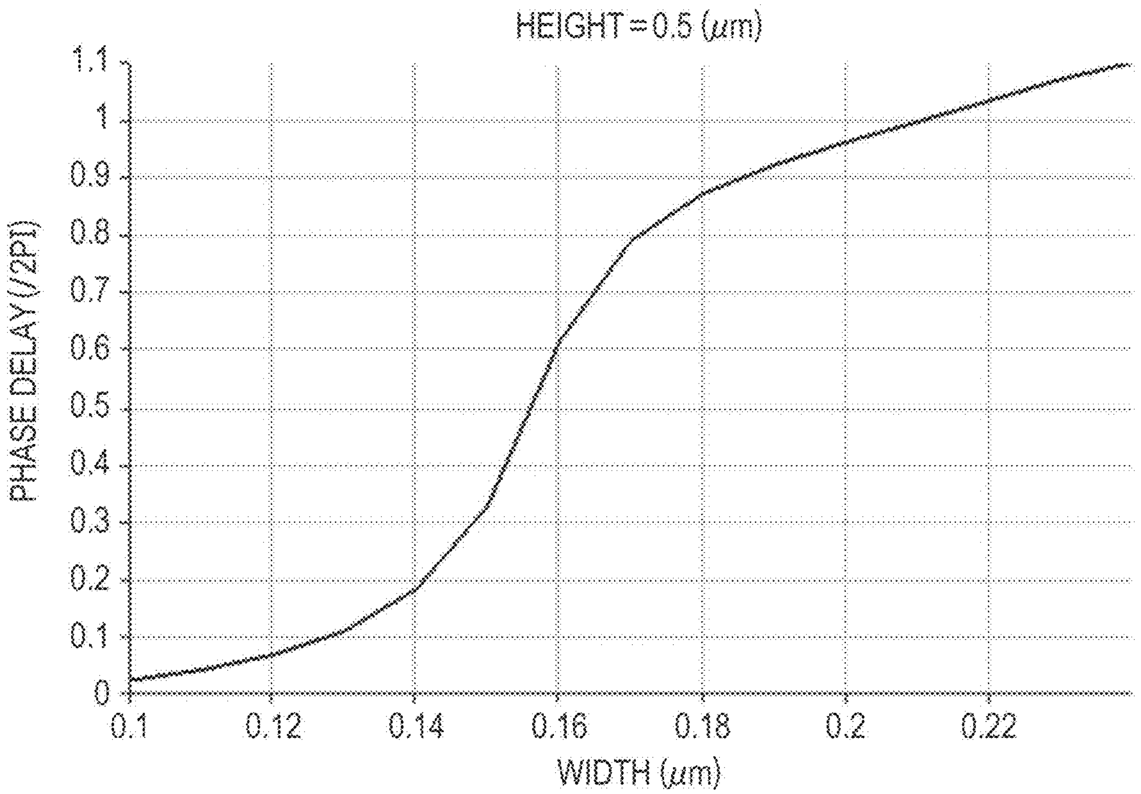
FIG. 34 is a view illustrating a phase delay with respect to a diameter of a pillar of a comparative meta-lens.
Figure 35:
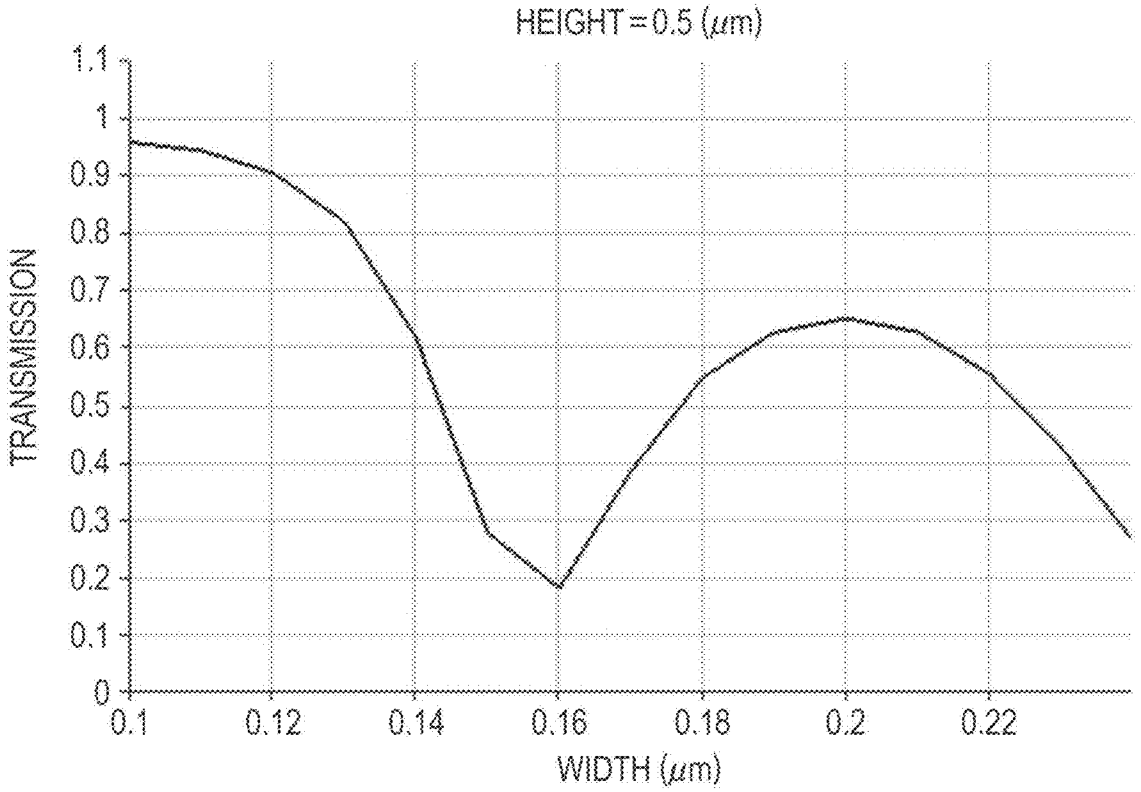
FIG. 35 is a view illustrating a transmission with respect to a diameter of a pillar of a comparative meta-lens.

On the other hand, FIG. 32 is a view illustrating phase shift amounts of a-Si pillars with respect to near-infrared light having a wavelength of 800 nm when the pillars arranged at a distance of 400 nm between the centers thereof are different in diameter and height, and FIG. 33 is a view illustrating transmissions of the pillars at that time. FIG. 34 illustrates a phase delay with respect to a diameter of a pillar of the comparative meta-lens, and FIG. 35 illustrates a transmission at that time. In the a-Si pillar, the range for the diameters of the pillars satisfying the phase delay condition of 0 to 2 n is almost the same as that for the diameters of the a-Si:H pillars. However, the transmission in this range is low. For example, when the diameter of the pillar is 160 nm, the transmission is 20% or less.

[Diffusion Meta-Lens]

Figure 36:
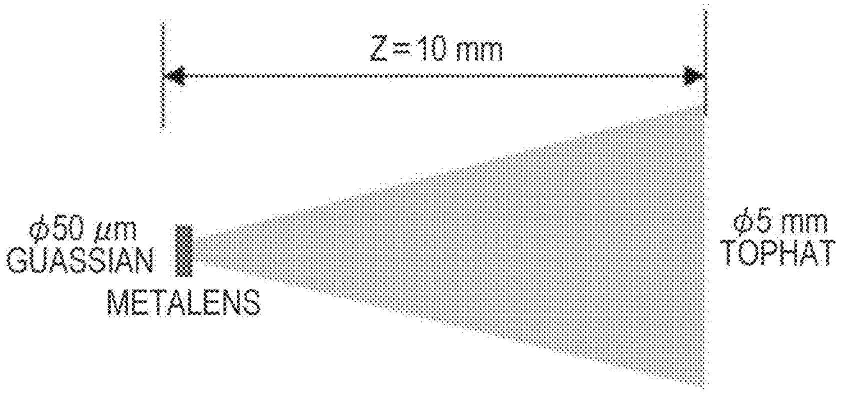
FIG. 36 is a view schematically illustrating an example of design specifications of a diffusion meta-lens.

A diffusion meta-lens including pillars made of a-Si:H and a comparative diffusion meta-lens including pillars made of a-Si were designed by deriving a phase formula for converting a Gaussian beam into a top hat on the basis of a known technique for deriving a phase formula for converting a Gaussian beam into a top hat as described in "Optics Communications, 462, (2020), 125313" etc., and deriving an optimum way of arranging pillars as described above. Design specifications of the top hat and the diffusion meta-lens are illustrated in FIG. 36.

Then, a simulation of electric field intensity distribution of each of the diffusion meta-lens and the comparative diffusion meta-lens was performed. The simulation was performed under the following conditions that: incident light has a wavelength λ of 800 nm, a distance between the centers of the pillars is 400 nm, the pillars have a height of 500 nm, and the pillars have diameters in the range of 100 to 220 nm.

Figure 37:
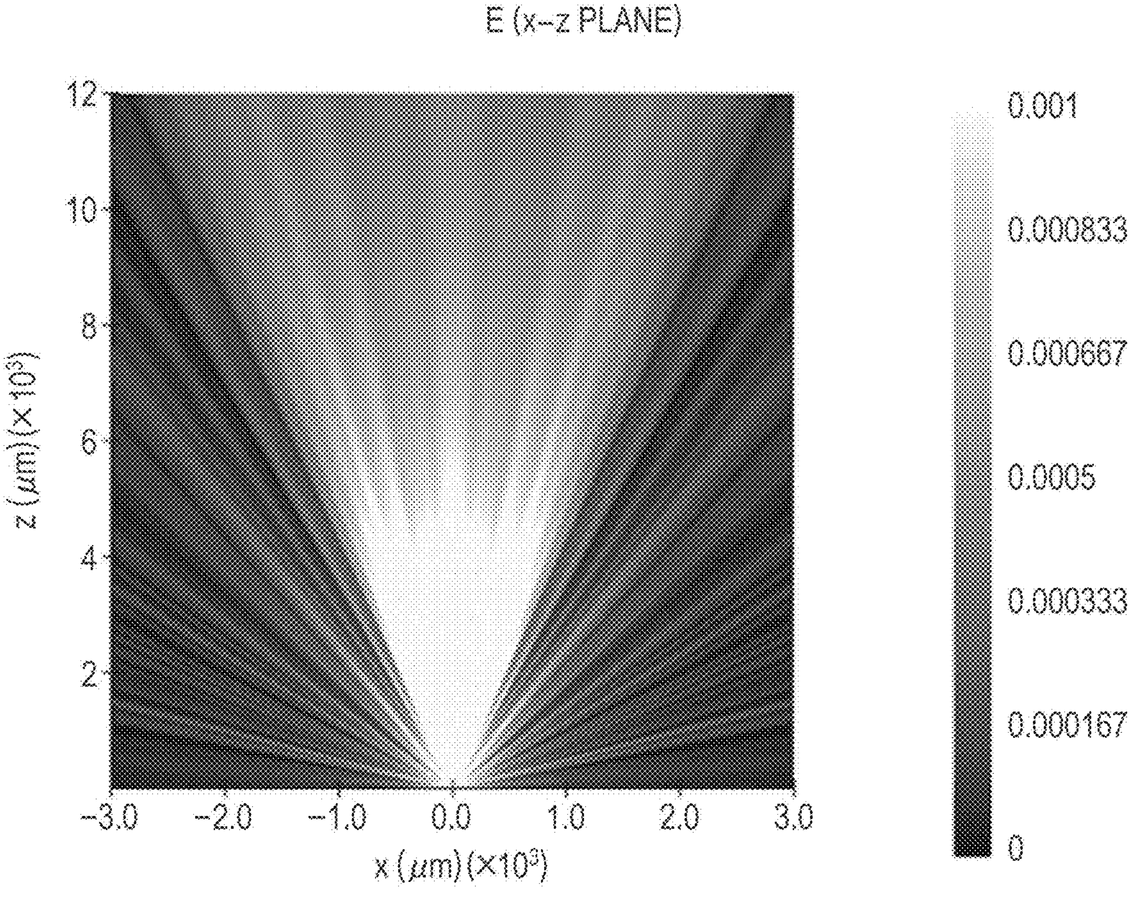
FIG. 37 is a view illustrating an electric field intensity distribution on an XZ plane (Y=0) of a diffusion meta-lens including pillars made of a-Si:H when near-infrared light having a wavelength of 800 nm was transmitted.
Figure 38:
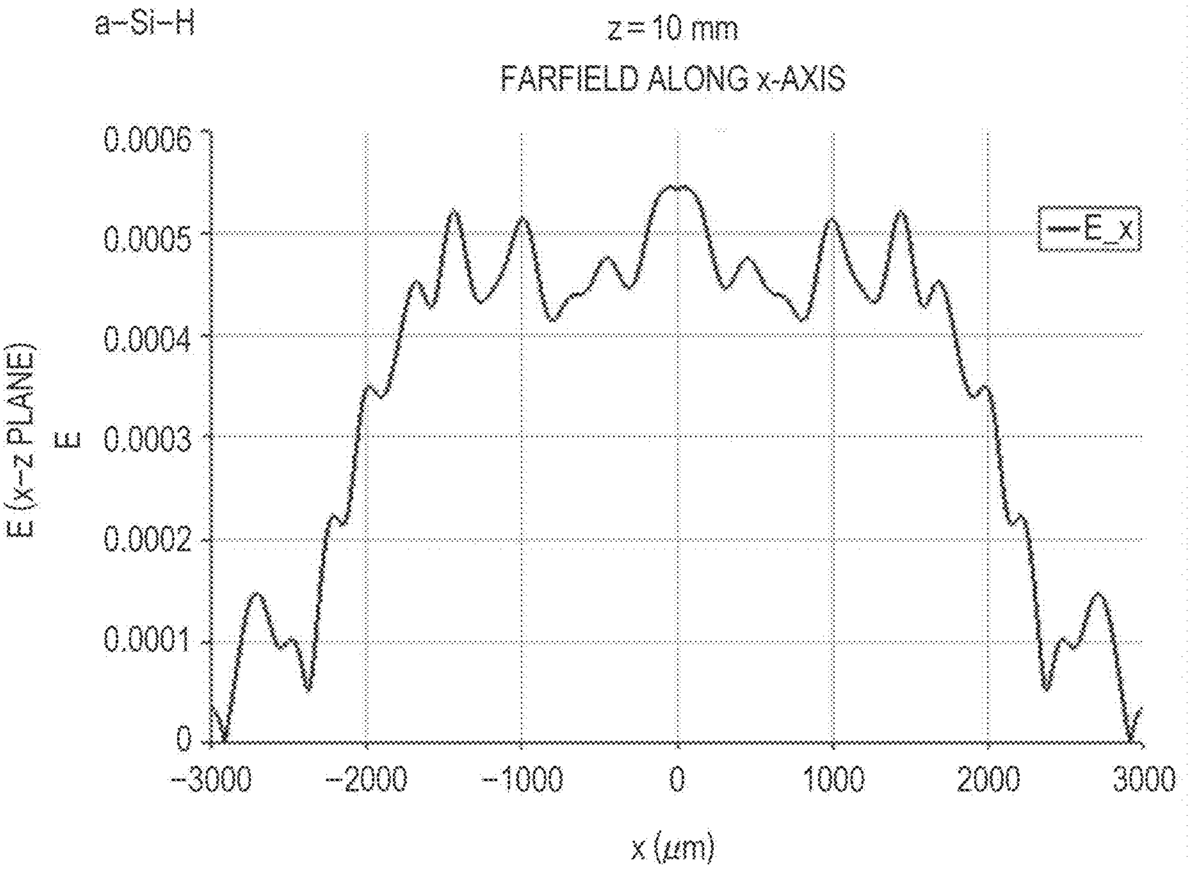
FIG. 38 is a view illustrating an intensity distribution on an X axis (Y=0 and Z=10 mm) of a diffusion meta-lens including pillars made of a-Si:H when near-infrared light having a wavelength of 800 nm was transmitted.
Figure 39:
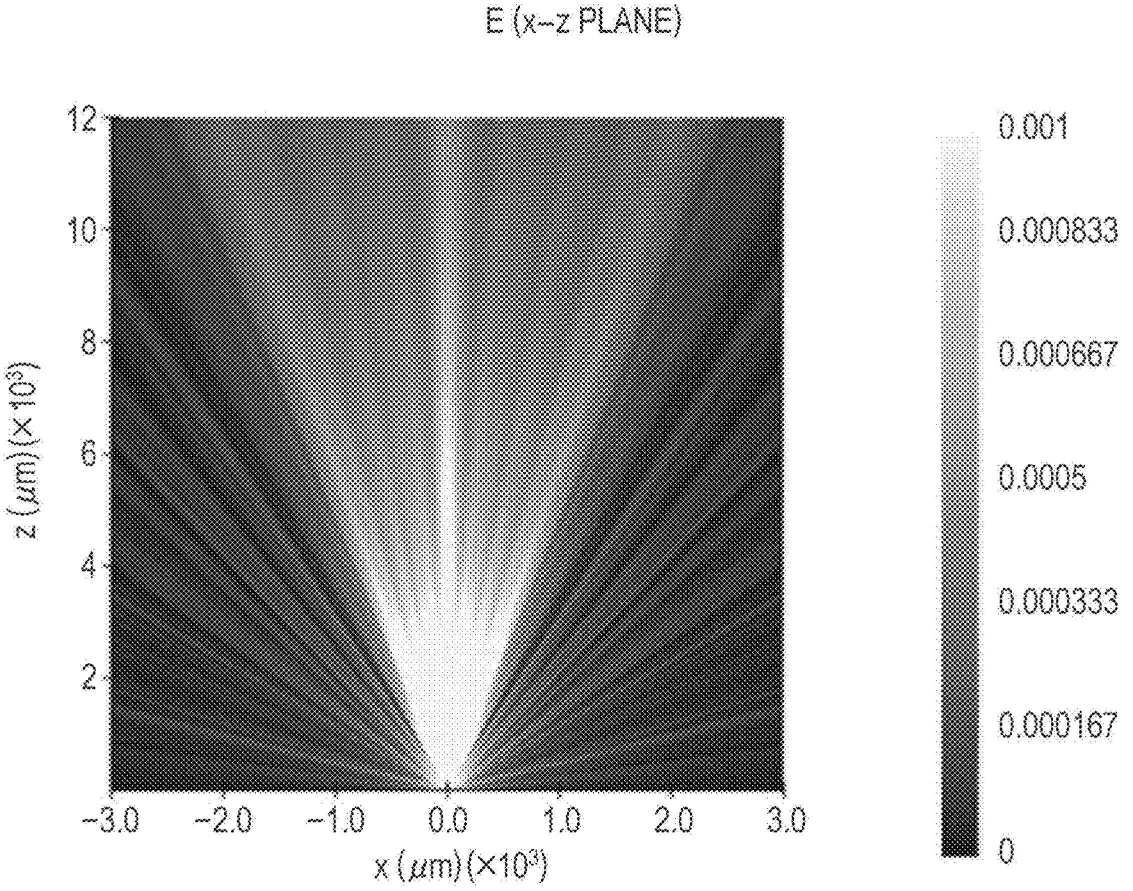
FIG. 39 is a view illustrating an intensity distribution on an XZ plane (Y=0) of a comparative diffusion meta-lens including pillars made of a-Si when near-infrared light having a wavelength of 800 nm was transmitted.
Figure 40:
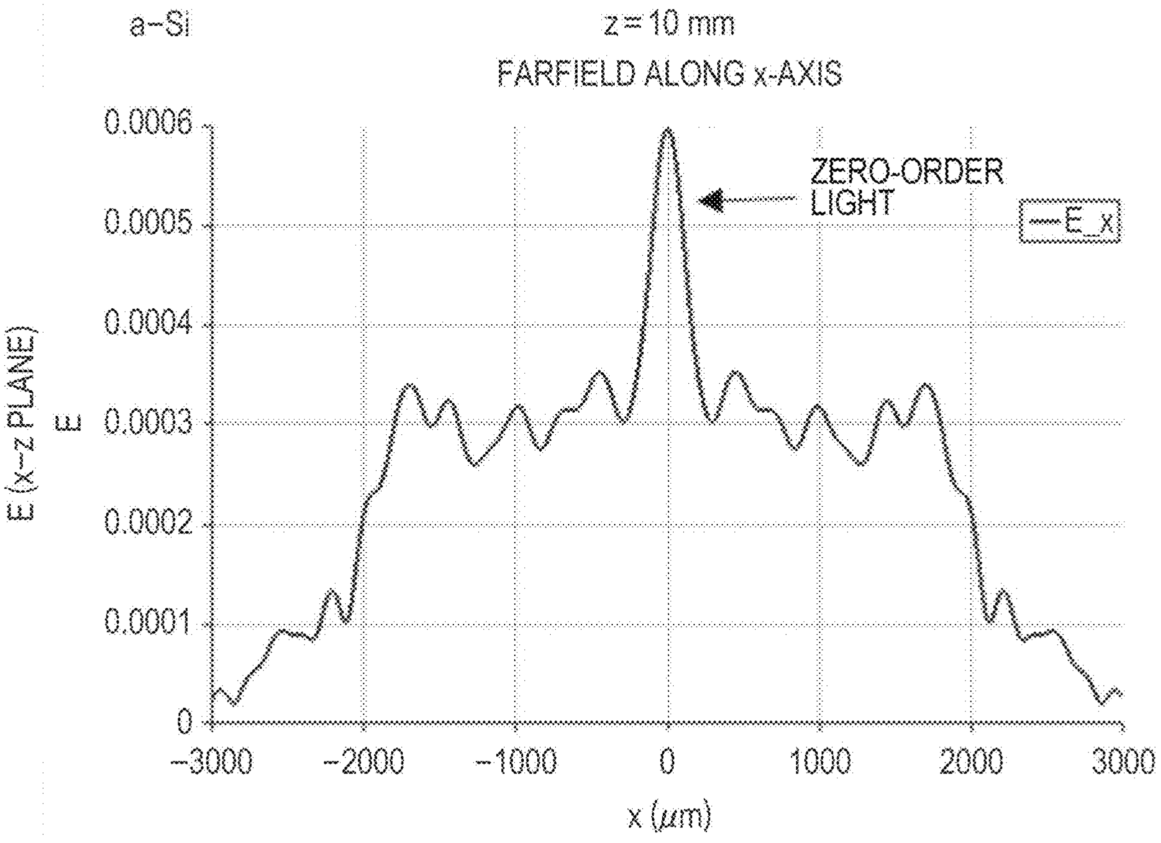
FIG. 40 is a view illustrating an intensity distribution on an X axis (Y=0 and Z=10 mm) of a comparative diffusion meta-lens including pillars made of a-Si when near-infrared light having a wavelength of 800 nm was transmitted.

FIG. 37 is a view illustrating an electric field intensity distribution on an XZ plane of the diffusion meta-lens including pillars made of a-Si:H when near-infrared light having a wavelength of 800 nm was transmitted. FIG. 38 is a view illustrating an electric field intensity of Y=0 and Z=10 mm on the X axis of the diffusion meta-lens including pillars made of a-Si:H when near-infrared light having a wavelength of 800 nm was transmitted. FIG. 39 is a view illustrating an electric field intensity on an XZ plane of the comparative diffusion meta-lens including pillars made of a-Si when near-infrared light having a wavelength of 800 nm was transmitted. FIG. 40 is a view illustrating an electric field intensity of Y=0 and Z=10 mm on the X axis of the comparative diffusion meta-lens including pillars made of a-Si when near-infrared light having a wavelength of 800 nm was transmitted.

As is clear from FIGS. 37 and 38, the diffusion meta-lens including pillars made of a-Si:H can obtain a shape close to the top hat. In contrast, as is clear from FIGS. 39 and 40, in the comparative diffusion meta-lens including pillars made of a-Si, an electric field intensity of diffused light is lower than that in the diffusion meta-lens including pillars made of a-Si:H, and zero-order light of incident light also appears.

[Polarized Light Separation Meta-Lens]

Figure 41:
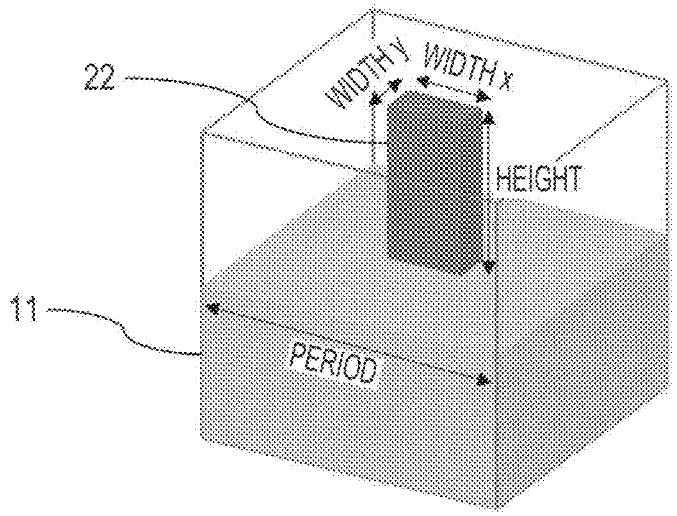
FIG. 41 is a view for explaining an analysis model used in electromagnetic field analysis of pillars used in a simulation.

When a cross-sectional shape of a pillar has low symmetry, the pillar itself causes a polarization-dependent phase delay. Therefore, the meta-lens having such pillars is capable of realizing a polarized light separation function without using an absorption type polarizer. A meta-lens including pillars was designed in such a manner that the pillars have a rectangular cross-sectional shape. Using an analysis model illustrated in FIG. 41, an electromagnetic field analysis was performed on pillars 22 made of a-Si:H. For comparison, an electromagnetic field analysis was performed on pillars made of a-Si as well. A substrate 11 is $SiO_2$. In the drawing, "width x" represents a long diameter of the pillar, and "width y" represents a short diameter of the pillar. The analysis was performed under the following conditions that: incident light has a wavelength A of 800 nm, a distance between the centers of the pillars is 400 nm, the pillars have a height of 500 nm, and the pillars have long diameters and small diameters in the range of 100 to 220 nm.

Figure 42:
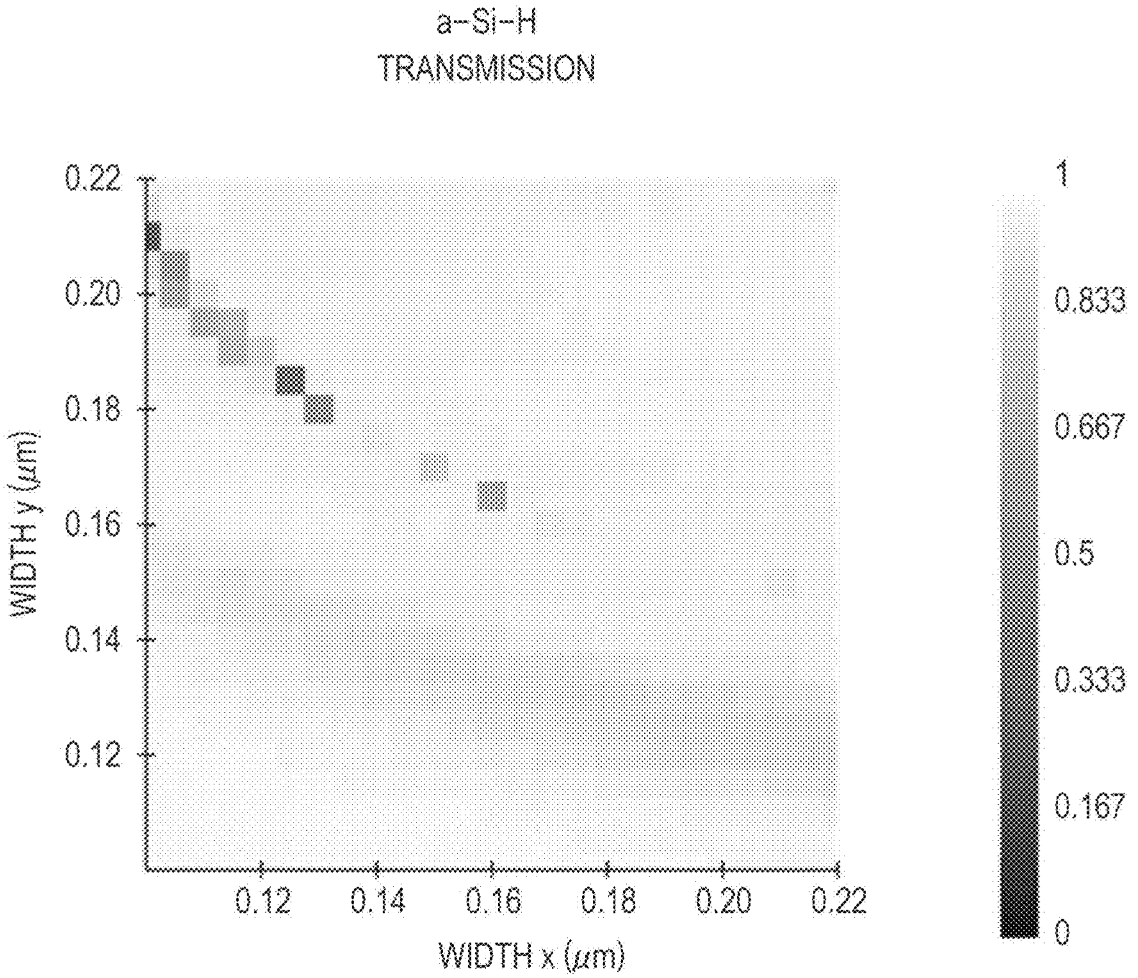
FIG. 42 is a view illustrating transmissions of a-Si:H pillars with respect to near-infrared light having a wavelength of 800 nm when the pillars are different in long diameter and short diameter.
Figure 43:
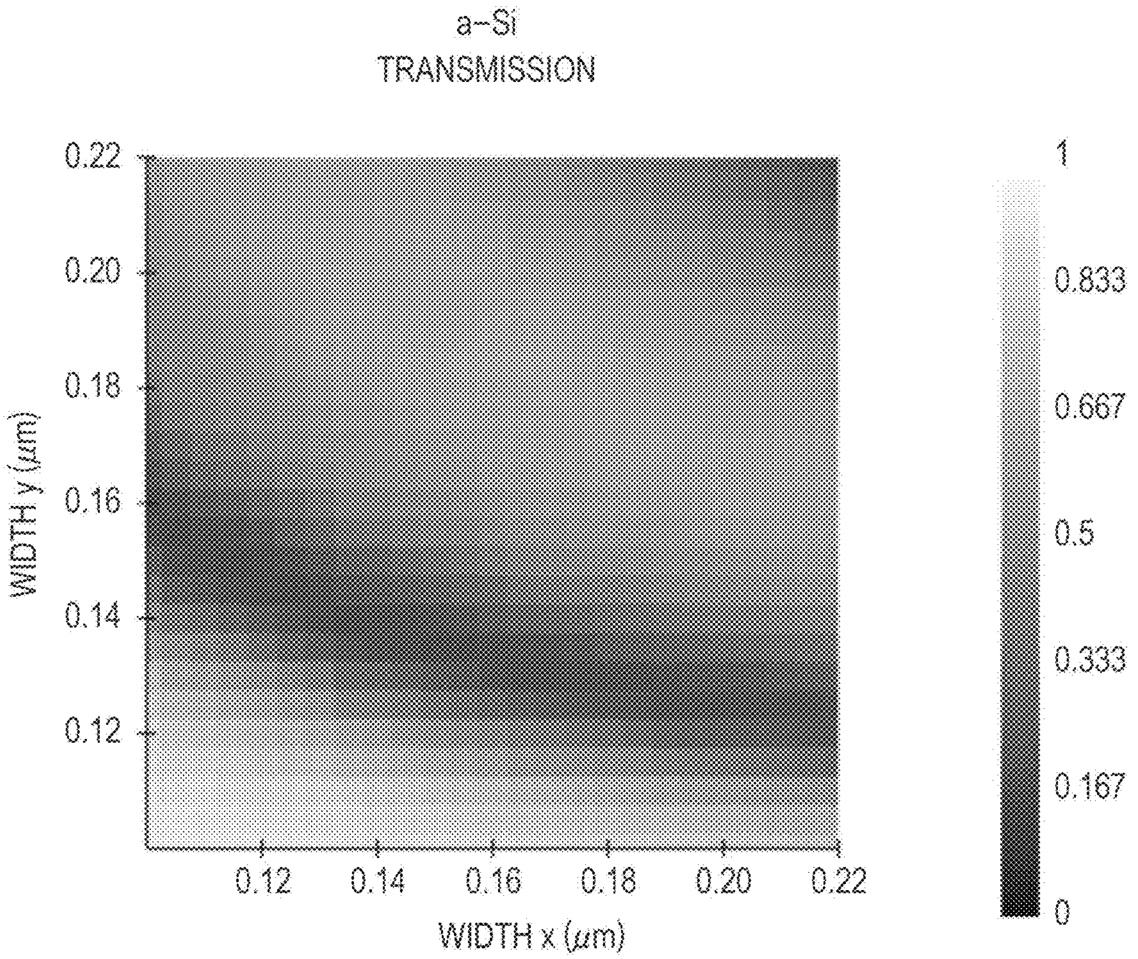
FIG. 43 is a view illustrating transmissions of a-Si pillars with respect to near-infrared light having a wavelength of 800 nm when the pillars are different in long diameter and short diameter.

Transmissions of a-Si:H pillars with respect to near-infrared light having a wavelength of 800 nm when the pillars are different in long diameter and short diameter are shown in FIG. 42. In addition, transmissions of a-Si pillars with respect to near-infrared light having a wavelength of 800 nm when the pillars are different in long diameter and short diameter are shown in FIG. 43. The a-Si:H pillars have an average transmission of 905 or more when both the long diameters and the short diameters of the a-Si:H pillars are in the range of 100 to 220 nm. On the other hand, it has been confirmed that the a-Si pillar has a transmission that deteriorates up to 20% or less when both the long diameters and the short diameters of the a-Si pillars are in the range of 100 to 220 nm.

As is clear from the various simulations described above, the present invention provides a meta-lens capable of condensing near-infrared light with high efficiency or uniformly enlarging near-infrared light, and furthermore, increasing a refraction angle on a lens even when condensing or enlarging the near-infrared light, which contributes to various industries and reductions in size, thickness and weight of near-infrared optical systems.

The meta-surface optical element according to the present invention can be independently applied as an optical element such as a lens in an optical system in various devices such as a drone, an endoscope, and an in-vehicle camera.

The refractive power in the meta-surface optical element is expressed by arranging pillars having different phase shift amounts. Therefore, a meta-surface optical element other than the meta-lens can also be manufactured by arranging pillars.

The meta-surface optical element according to the present invention can be used for an imaging optical system or an illumination optical system. The meta-surface optical element according to the present invention can also be used to separate polarized light. In a case where the meta-surface optical element according to the present invention is applied to an imaging optical system, the amount of light in the image circle can be made uniform. On the other hand, in a case where the meta-surface optical element according to the present invention is applied to an illumination optical system, it is possible to uniformly increase the light amount in the illumination range. In particular, in a case where the meta-surface optical element according to the present invention is applied for so-called laser illumination using a laser as a light source, zero-order light of the laser can be effectively suppressed, thereby realizing uniform illumination in a top hat shape.

In the above description of the embodiment, the pillars are away from each other at an equal distance between the centers thereof, but the present invention is not limited thereto. In the present invention, one meta-surface optical element may have not only one type of distance between the centers of the pillars but also a plurality of types of distances between the centers of the pillars as long as a desired function is exhibited as the meta-surface optical element.

SUMMARY

Materials of a film of a conventional optical element include $TiO_2$ and $Si_3N_4$. For example, $TiO_2$ has a refractive index of about 2.7, and the pillars are required to have a height of about 1 μm when a meta-lens is manufactured. Further, for example, $Si_3N_4$ has a refractive index of about 2.0, and the pillar structures are required to have a height of about 1.2 μm when a meta-lens is manufactured. For this reason, it is difficult to manufacture a meta-lens. Furthermore, $TiO_2$ or $Si_3N_4$ greatly increases an aspect ratio of a pillar, making the pillar to easily adhere to the adjacent pillars and thereby forming an aggregate, and as a result, the meta-lens is likely to deteriorate in performance when tested for durability.

On the other hand, a meta-lens is manufactured by using pillars having a height of about 500 nm with a high refractive index of an a-Si film being about 3.5. However, the transmission cannot be increased with respect to light in the wavelength region of 700 to 850 nm. Although the transmission can be somewhat improved by decreasing the cross-sectional area of the pillar, the improved transmission is about 70% at most, and it is difficult to realize a transmission of 90% or more.

The pillars made of a-Si:H are capable of satisfying a phase delay condition in the meta-surface optical element and exhibiting a high transmission, for example, an average transmission of 90% or more, as compared with those of the a-Si pillars that does not substantially contain hydrogen in its structure. Therefore, the meta-surface optical element including a-Si:H pillars exhibits both a high transmission and a high refractive index in the wavelength region of near-infrared light. Accordingly, it is expected that the application and utilization of the meta-surface optical element including a-Si:H pillars to/in the field of the wavelength region of near-infrared light are promoted.

Note that such a meta-surface optical element can be designed and manufactured by determining phase shift amounts of light by pillars having a high average transmission of 90% or more on the substrate and arranging the pillars having desired phase shift amounts, and as a result, it is possible to achieve various meta-surface optical elements that are highly efficient in the near-infrared region.

As is clear from the above description, according to a first aspect of the present invention, a meta-surface optical element (meta-lens 1) includes a substrate (11), and pillars (12) made of a-Si:H and arranged on a surface of the substrate, in which the pillars on the surface of the substrate are away from each other at a distance in a range of 300 to 450 nm between the centers thereof, the pillars have heights in a range of 300 to 580 nm, and the pillars have diameters in a range of 100 to 250 nm.

Since the pillars have diameters in the range of 100 to 250 nm and the pillars have heights in the range of 300 to 580 nm, a transmission with respect to near-infrared light in the above-described wavelength range can be 90% or more.

As described above, according to the first aspect, in a correlation between the height and the diameter of the pillar, the meta-surface optical element includes a series of regions including phase shift amounts from −π to π with high transmission. Therefore, it is easy to design and manufacture pillars and a meta-surface optical element, and it is possible to provide a meta-surface optical element having excellent optical characteristics even at a wavelength of 700 to 850 nm and excellent productivity.

According to a second aspect of the present invention, in the first aspect, the pillars have a uniform height. In the second aspect, since the phase shift amounts of the pillars can be adjusted by the diameters of the pillars, it is possible to more simply design the meta-surface optical element and manufacture the pillars, which is more effective in improving productivity.

According to a third aspect of the present invention, in the first aspect or the second aspect, the pillars have a circular, elliptical, or polygonal cross-sectional shape. The third aspect is effective in realizing various optical elements such as a condenser lens, a magnifying lens (diffusion lens), and a polarized light separation lens.

According to a fourth aspect of the present invention, in any one of the first to third aspects, the pillars on the surface of the substrate are away from each other at a distance of 300 nm between the centers thereof, the pillars have heights in a range of 300 to 400 nm, and the pillars have diameters in a range of 100 to 200 nm. The fourth aspect is suitable for realizing a meta-surface optical element targeting near-infrared light having a wavelength of 700 nm.

According to a fifth aspect of the present invention, in any one of the first to third aspects, the pillars on the surface of the substrate are away from each other at a distance in a range of 350 to 400 nm between the centers thereof, the pillars have heights in a range of 400 to 550 nm, and the pillars have diameters in a range of 100 to 220 nm. The fifth aspect is suitable for realizing a meta-surface optical element targeting near-infrared light having a wavelength of 750 nm.

According to a sixth aspect of the present invention, in any one of the first to third aspects, the pillars on the surface of the substrate are away from each other at a distance in a range of 350 to 450 nm between the centers thereof, the pillars have heights in a range of 400 to 550 nm, and the pillars have diameters in a range of 100 to 250 nm. The sixth aspect is suitable for realizing a meta-surface optical element targeting near-infrared light having a wavelength of 800 nm.

According to a seventh aspect of the present invention, in any one of the first to third aspects, the pillars on the surface of the substrate are away from each other at a distance in a range of 350 to 450 nm between the centers thereof, the pillars have heights in a range of 380 to 580 nm, and the pillars have diameters in a range of 100 to 250 nm. The seventh aspect is suitable for realizing a meta-surface optical element targeting near-infrared light having a wavelength of 850 nm.

A conventional lens having a shape of a glass material emits a lot of carbon dioxide during the manufacturing process, which is not preferable in terms of environmental impact. By replacing this with the meta-lens, the emission of carbon dioxide during the lens manufacturing process can be further suppressed. The present invention is expected to contribute to, for example, the achievement of the goal 13 for climate change countermeasures of the sustainable development goals (SDGs) proposed by the United Nations.

The present invention is not limited to the above-described embodiments, and various modifications can be made within the scope set forth in the claims. Embodiments obtained by appropriately combining technical means disclosed in the different embodiments also fall within the technical scope of the present invention.

What is claimed is:

1. A meta-surface optical element comprising:

a substrate; and pillars made of hydrogenated amorphous silicon arranged on a surface of the substrate;

wherein the pillars on the surface of the substrate are away from each other at a distance in a range of 300 to 450 nm between centers thereof, the pillars have heights in a range of 300 to 580 nm, the pillars have diameters in a range of 100 to 250 nm, and a hydrogen content in the hydrogenated amorphous silicon is 8 atom % or more and 25 atom % or less with respect to Si atoms.

2. The meta-surface optical element according to claim 1, wherein the pillars have a uniform height.

3. The meta-surface optical element according to claim 1, wherein the pillars have a circular, elliptical, or polygonal cross-sectional shape.

4. The meta-surface optical element according to claim 1, wherein the pillars on the surface of the substrate are away from each other at a distance of 300 nm between the centers thereof, the pillars have heights in a range of 300 to 400 nm, and the pillars have diameters in a range of 100 to 200 nm.

5. The meta-surface optical element according to claim 1, wherein the pillars on the surface of the substrate are away from each other at a distance in a range of 350 to 400 nm between the centers thereof, the pillars have heights in a range of 400 to 550 nm, and the pillars have diameters in a range of 100 to 220 nm.

6. The meta-surface optical element according to claim 1, wherein the pillars on the surface of the substrate are away from each other at a distance in a range of 350 to 450 nm between the centers thereof, the pillars have heights in a range of 400 to 550 nm, and the pillars have diameters in a range of 100 to 250 nm.

7. The meta-surface optical element according to claim 1, wherein the pillars on the surface of the substrate are away from each other at a distance in a range of 350 to 450 nm between the centers thereof, the pillars have heights in a range of 380 to 580 nm, and the pillars have diameters in a range of 100 to 250 nm.

8. The meta-surface optical element according to claim 1, wherein the hydrogen content in the hydrogenated amorphous silicon is 10 atom % or more and 20 atom % or less with respect to Si atoms.

9. The meta-surface optical element according to claim 1, configured to target near-infrared light having a wavelength of 700 to 850 nm.

* * * * *